(12) United States Patent
Welch et al.

(10) Patent No.: US 10,829,020 B2
(45) Date of Patent: Nov. 10, 2020

(54) VEHICLE SEATING ARRANGEMENT

(71) Applicant: Ford Global Technologies, LLC, Dearborn, MI (US)

(72) Inventors: Ryan Welch, Ottawa Lake, MI (US); Joshua Greiner, Detroit, MI (US); Cameron Wood, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 15/886,321

(22) Filed: Feb. 1, 2018

(65) Prior Publication Data

US 2019/0232843 A1 Aug. 1, 2019

(51) Int. Cl.
| | |
|---|---|
| *B60N 2/90* | (2018.01) |
| *B60N 2/75* | (2018.01) |
| *B60N 2/56* | (2006.01) |
| *B60N 2/64* | (2006.01) |

(52) U.S. Cl.
CPC .......... *B60N 2/986* (2018.02); *B60N 2/5621* (2013.01); *B60N 2/643* (2013.01); *B60N 2/753* (2018.02)

(58) Field of Classification Search
CPC . B60N 2/986; B60N 2/75; B60N 2/64; B60N 2/757; B60N 2/3015; B60R 5/006
See application file for complete search history.

(56) References Cited

U.S. PATENT DOCUMENTS

| | | | | |
|---|---|---|---|---|
| 2,621,708 A | * | 12/1952 | Luce, Jr. ................ | A47C 1/122 |
| | | | | 297/117 |
| 4,496,189 A | * | 1/1985 | Tanizaki ................ | A47C 1/023 |
| | | | | 297/112 |
| 5,433,503 A | * | 7/1995 | De Filippo ............ | B60N 2/757 |
| | | | | 297/115 |
| 5,720,514 A | | 2/1998 | Carlsen et al. | |
| 5,788,324 A | | 8/1998 | Shea et al. | |
| 5,816,650 A | | 10/1998 | Lucas, Jr. | |
| 6,024,411 A | | 2/2000 | Pesta et al. | |
| 6,036,252 A | | 3/2000 | Hecksel et al. | |
| 6,213,546 B1 | * | 4/2001 | Malusev ................ | B60N 2/757 |
| | | | | 297/113 |
| 6,217,112 B1 | | 4/2001 | Linsenmeier et al. | |
| 6,247,751 B1 | | 6/2001 | Faust et al. | |
| 6,419,313 B1 | | 7/2002 | Newman | |
| 6,488,327 B1 | | 12/2002 | Pearse et al. | |
| 6,508,508 B1 | | 1/2003 | Bargiel | |
| 6,623,074 B2 | | 9/2003 | Asbach et al. | |
| 6,811,200 B2 | * | 11/2004 | Shibata ................... | B60N 2/01 |
| | | | | 296/64 |
| 6,877,807 B2 | | 4/2005 | Mizuno et al. | |
| 7,255,402 B1 | * | 8/2007 | Haddad ................... | B60N 2/76 |
| | | | | 297/411.32 |
| 7,523,985 B2 | | 4/2009 | Bhatia et al. | |
| 7,628,453 B2 | * | 12/2009 | Herkenrath .......... | B60N 2/0252 |
| | | | | 297/284.9 |

(Continued)

FOREIGN PATENT DOCUMENTS

WO 0047442 A1 8/2000

*Primary Examiner* — David R Dunn
*Assistant Examiner* — Tania Abraham
(74) *Attorney, Agent, or Firm* — David Coppiellie; Price Heneveld LLP

(57) ABSTRACT

A vehicle seating arrangement includes a first seat and a first seatback. A side-wing seat extends from the first seat. A surface of the side-wing seat is vertically displaced from a surface of the first seat.

19 Claims, 21 Drawing Sheets

(56) References Cited

U.S. PATENT DOCUMENTS

| | | | | |
|---|---|---|---|---|
| 7,823,950 B2* | 11/2010 | Toyota | ................... | B60N 2/062 |
| | | | | 296/65.01 |
| 7,980,617 B2* | 7/2011 | Brncick | ................... | B60N 2/01 |
| | | | | 296/64 |
| 8,033,604 B2* | 10/2011 | Behrens | ............... | B60N 2/3011 |
| | | | | 297/188.1 |
| 8,770,661 B2 | 7/2014 | Kalergis et al. | | |
| 9,481,310 B2 | 11/2016 | Chawlk et al. | | |
| 2004/0124687 A1* | 7/2004 | Nae | ........................ | B60N 2/777 |
| | | | | 297/411.32 |
| 2007/0069561 A1* | 3/2007 | Schnabel | ................ | B60R 5/006 |
| | | | | 297/238 |
| 2007/0085363 A1 | 4/2007 | Sturt et al. | | |
| 2009/0121523 A1 | 5/2009 | Johnson | | |
| 2009/0288800 A1* | 11/2009 | Kang | ..................... | B60N 2/793 |
| | | | | 165/42 |
| 2010/0244502 A1* | 9/2010 | Andersson | ............. | B60N 3/102 |
| | | | | 297/118 |
| 2014/0117731 A1* | 5/2014 | Asli | ........................ | B64D 11/06 |
| | | | | 297/284.9 |
| 2015/0166181 A1* | 6/2015 | Scott | .................. | B64D 11/0601 |
| | | | | 297/248 |

\* cited by examiner

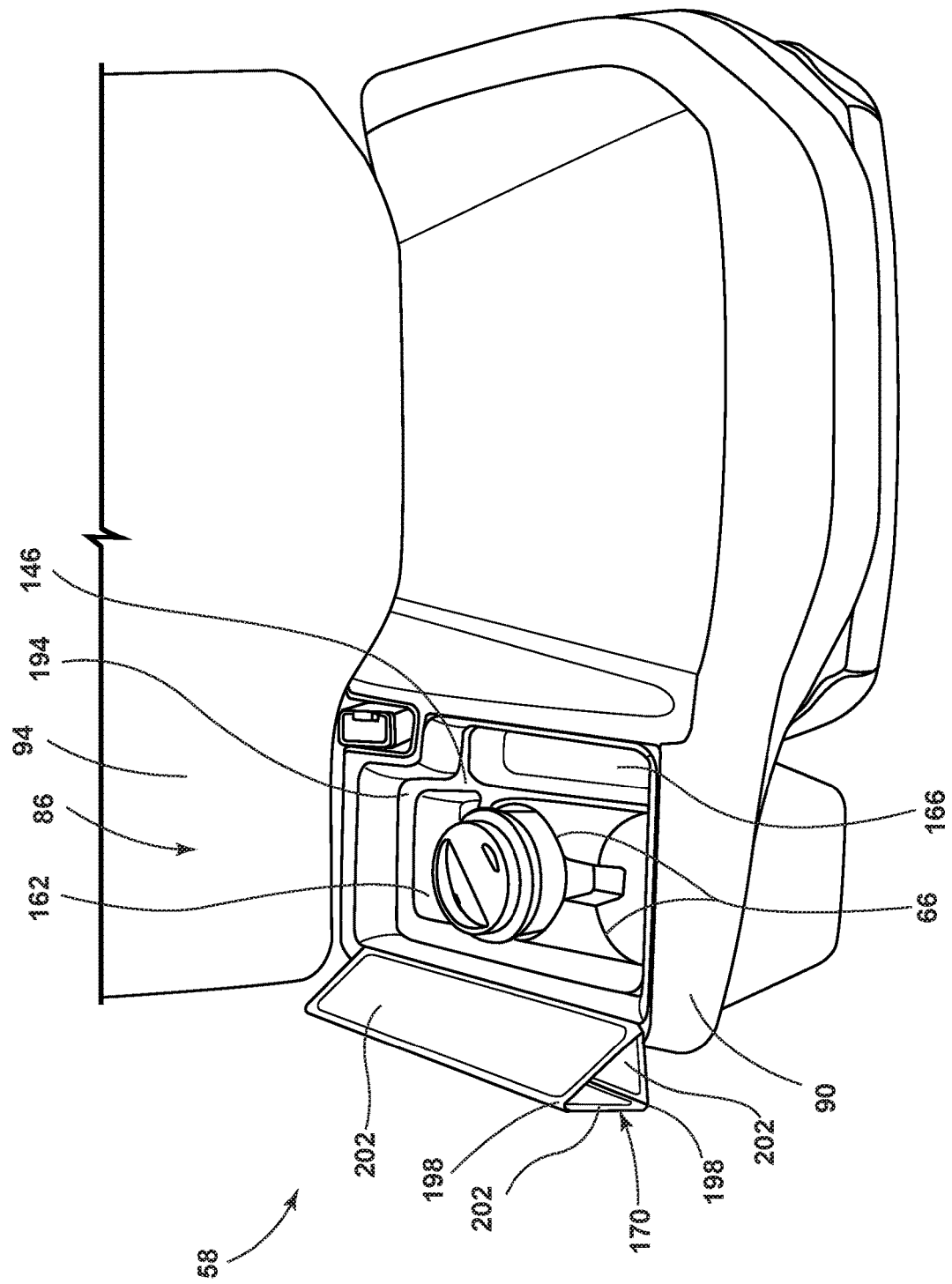

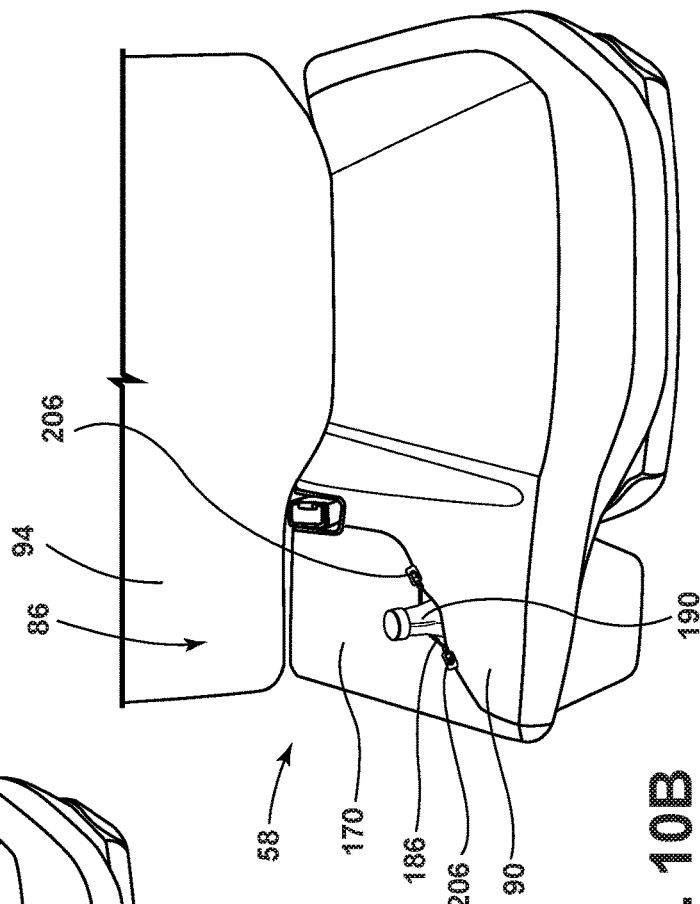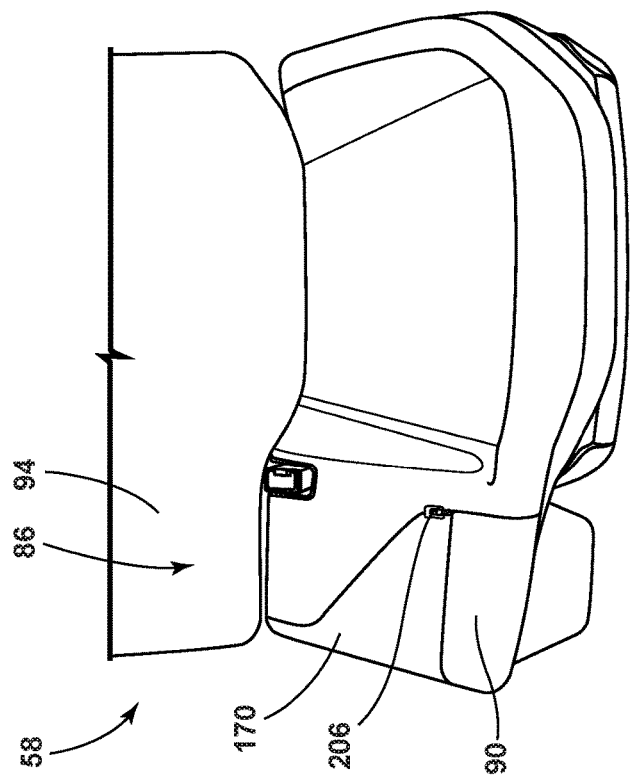

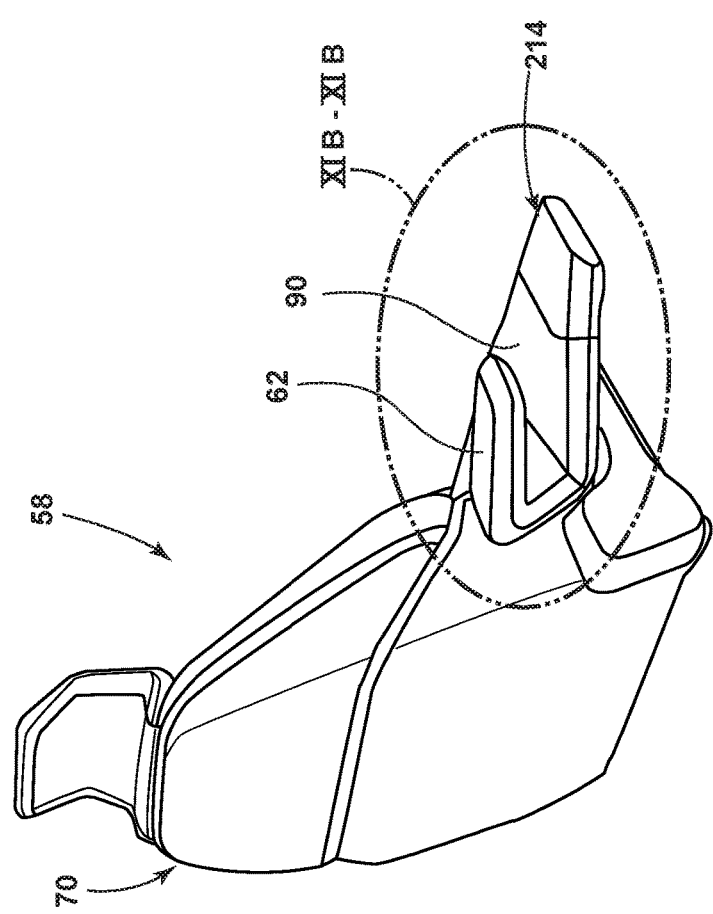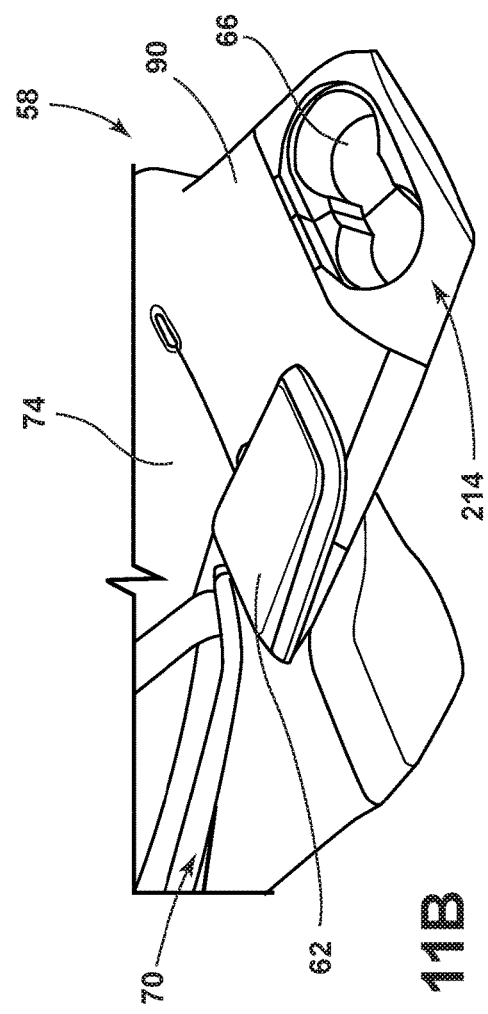
FIG. 11A
FIG. 11B

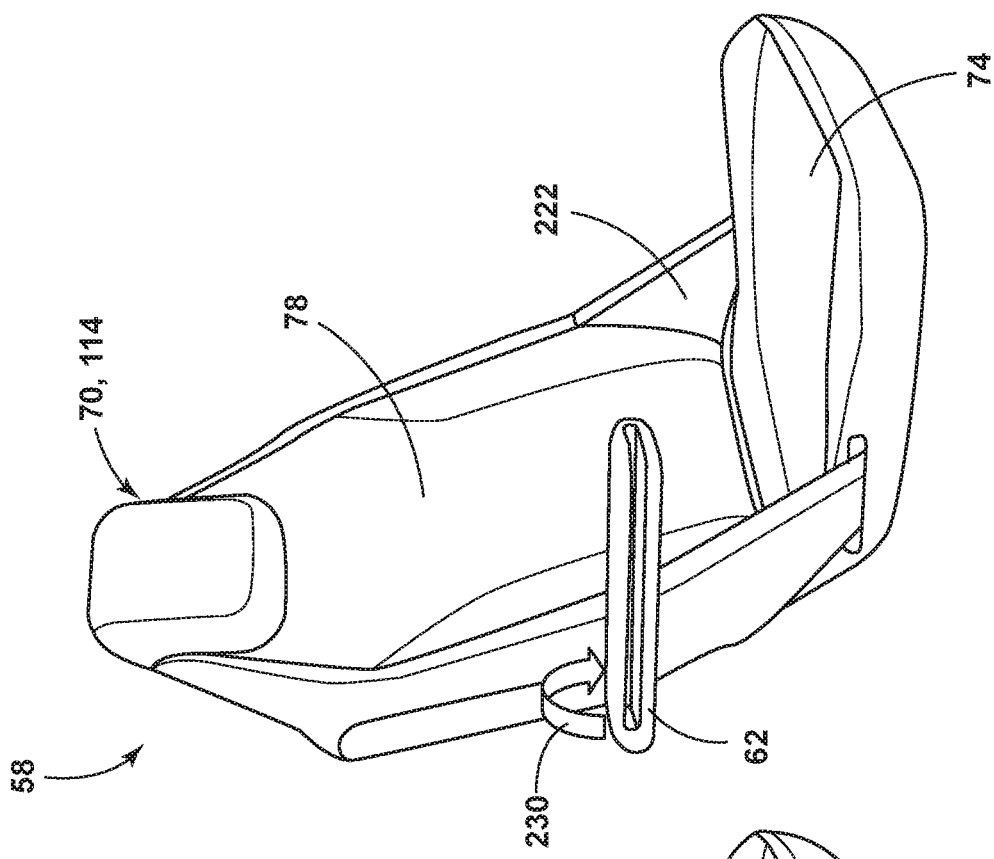
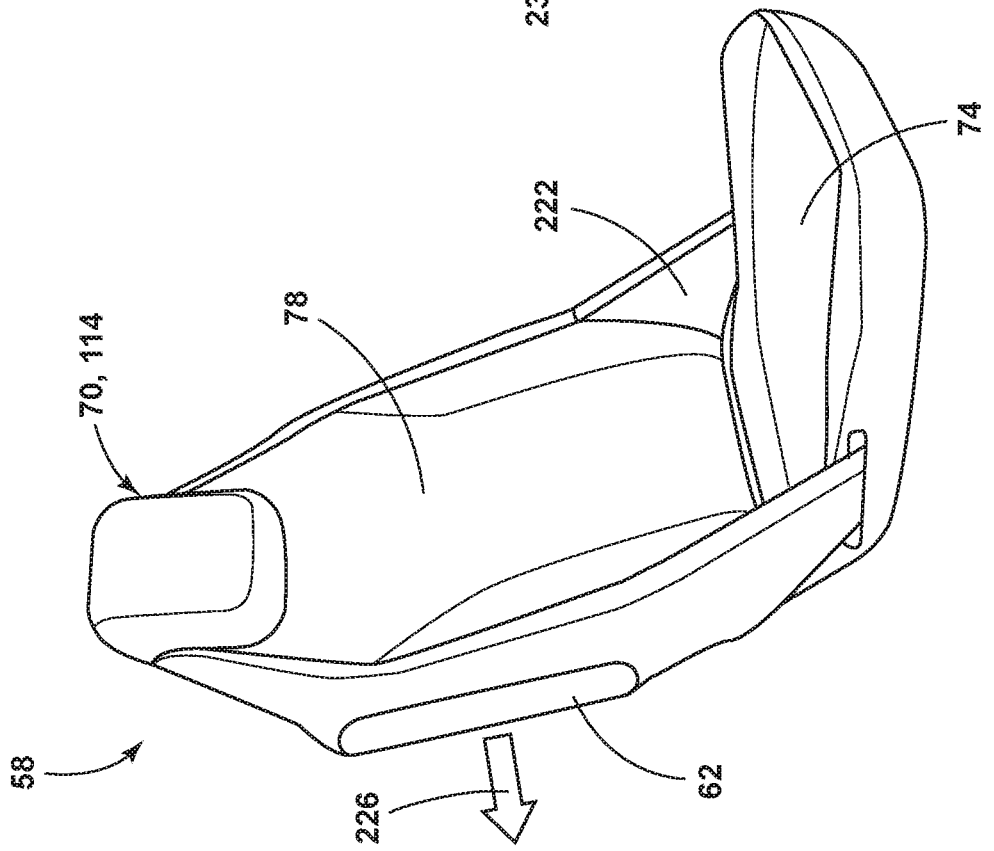

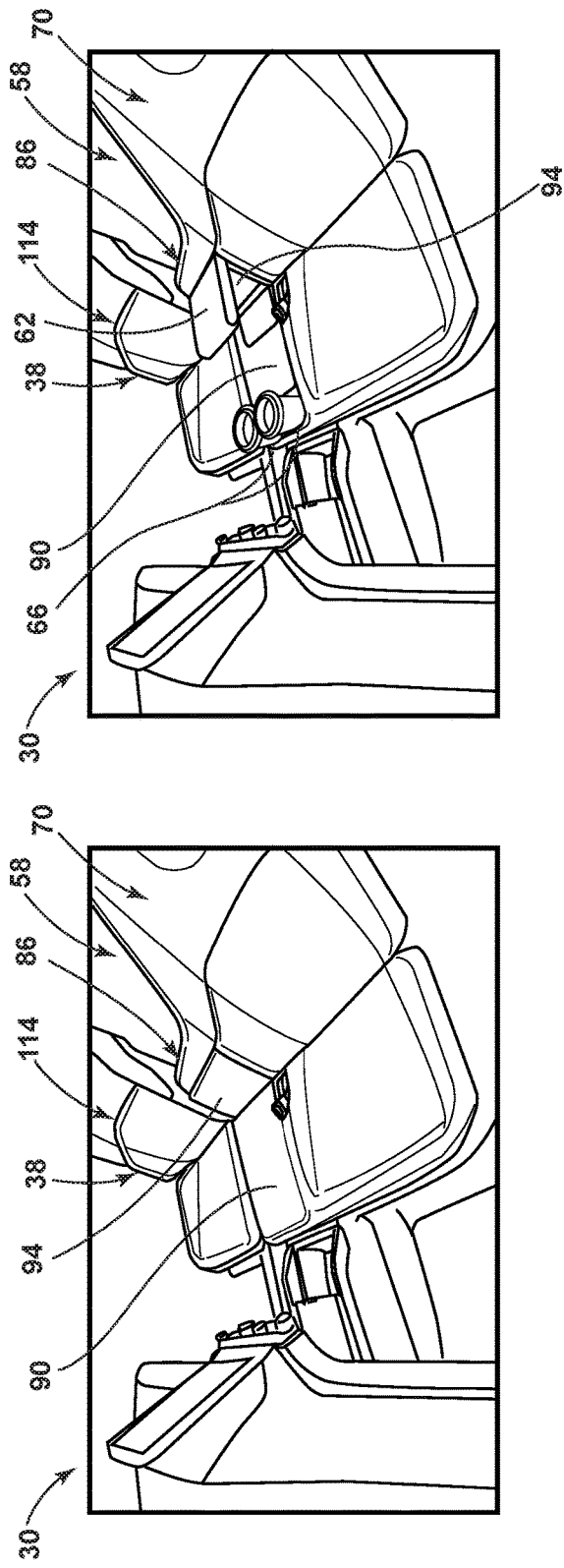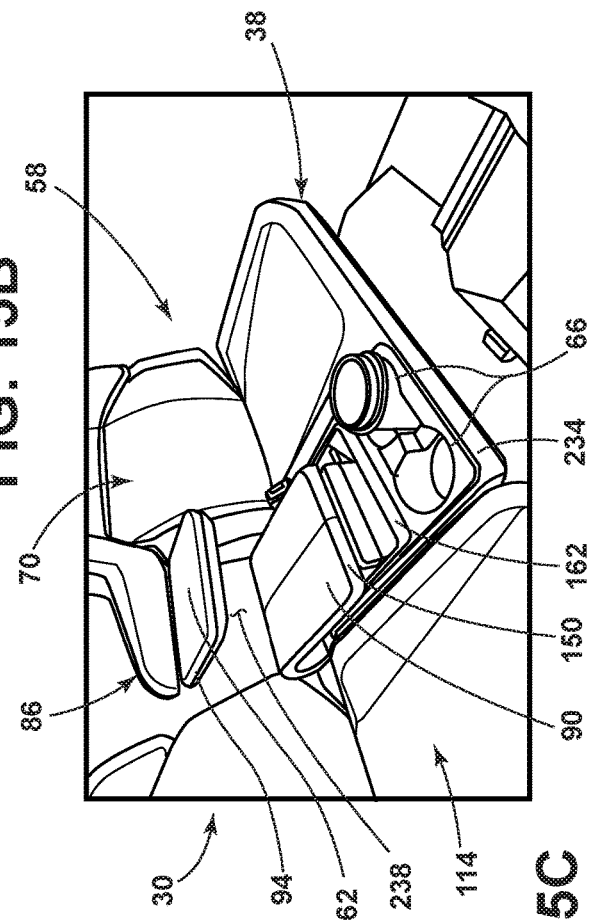

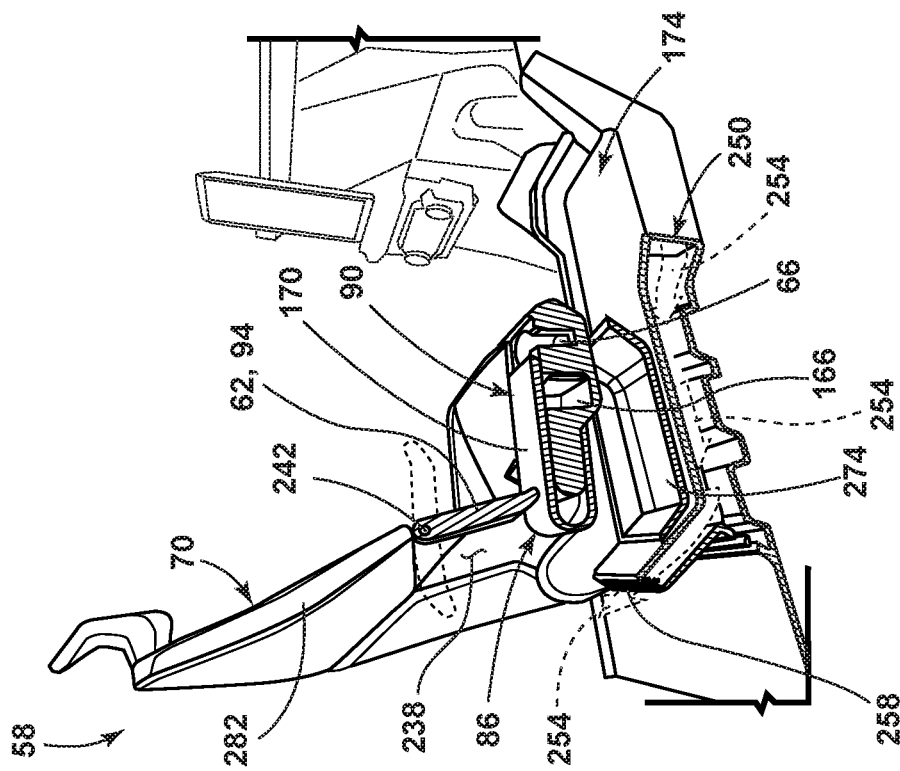
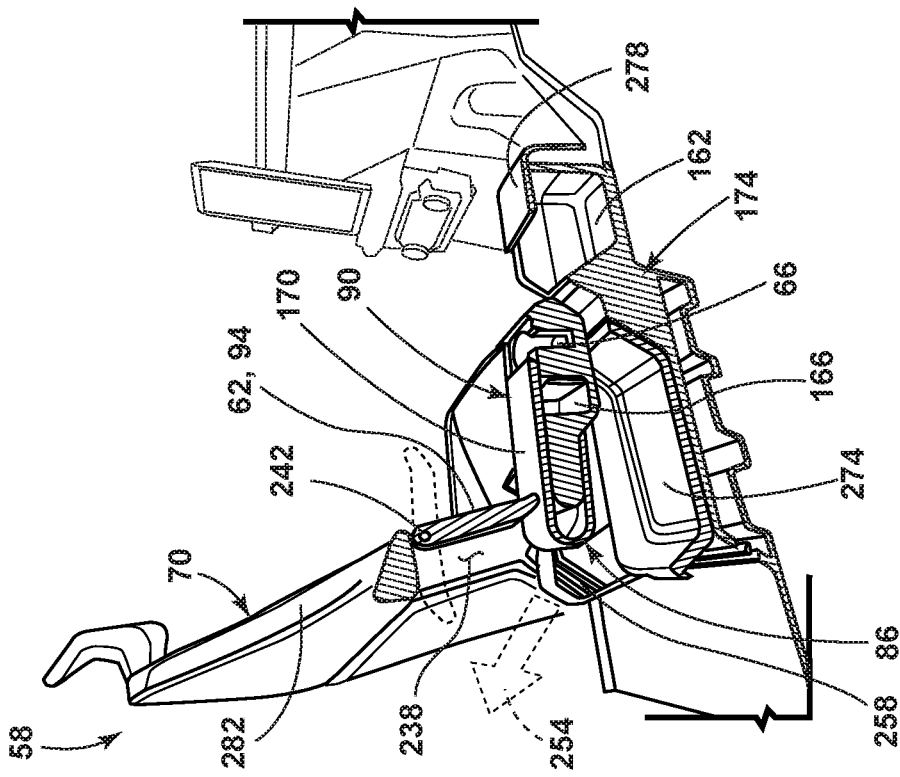

US 10,829,020 B2

VEHICLE SEATING ARRANGEMENT

FIELD OF THE DISCLOSURE

The present disclosure generally relates to vehicles. More specifically, the present disclosure relates to vehicle seating arrangements.

BACKGROUND OF THE INVENTION

Vehicle seating arrangements often include a plurality of vehicle seating assemblies. These vehicle seating arrangements are sometimes provided with comfort or convenience features, such as, storage solutions, armrests, and bolsters. However, there is a need for new solutions to the needs of consumers that provide a more integrated and aesthetically pleasing appearance.

SUMMARY OF THE INVENTION

According to a first aspect of the present disclosure, a vehicle seating arrangement includes a first seat and a first seatback. A side-wing seat extends from the first seat. A surface of the side-wing seat is vertically displaced from a surface of the first seat.

Embodiments of the first aspect of the present disclosure can include any one or a combination of the following features:
  the vehicle seating arrangement further includes a side-wing seatback extending from the first seatback, wherein a surface of the side-wing seatback is longitudinally displaced from the first seatback, wherein the first seat and the first seatback define a first seating assembly, and wherein the side-wing seat and the side-wing seatback cooperate to provide a second seating assembly;
  the surface of the side-wing seat is vertically displaced to be above the surface of the first seat;
  the side-wing seatback is longitudinally displaced rearward from the first seatback;
  the first and second seating assemblies are slidably mounted to a floor of a vehicle such that an area of the floor directly below the first seat of the first seating assembly is free of engagement from components of the vehicle seating arrangement;
  the side-wing seat is provided with at least one storage area;
  the vehicle seating arrangement further includes an armrest that is coupled to the side-wing seatback;
  the armrest is deployable from the side-wing seatback;
  the armrest is deployable from the side-wing seatback by extending the armrest out of an upper portion of the side-wing seatback followed by rotation of the armrest in a downward direction;
  the armrest is deployable from the side-wing seatback by rotational motion away from the side-wing seatback in an upward direction;
  the vehicle seating arrangement further includes a hip bolster that is deployable;
  the hip bolster is deployable from the first seatback;
  the vehicle seating arrangement further includes an armrest that is deployable from the first seatback;
  the armrest is deployed by a first movement in a lateral direction outwardly from the first seatback and a second movement in a longitudinal direction that is substantially perpendicular to the lateral direction; and
  the vehicle seating arrangement further includes a third seating assembly positioned adjacent to the second seating assembly, wherein the side-wing seatback of the second seating assembly is at least partially carried on the third seating assembly.

According to a second aspect of the present disclosure, a vehicle seating arrangement includes a first seat and a first seatback. A side-wing seat and a side-wing seatback extending from the first seat and the first seatback, respectively. A surface of the side-wing seat is vertically displaced from a surface of the first seat. The side-wing seatback is longitudinally displaced from the seatback. An armrest is deployable from the side-wing seatback.

Embodiments of the second aspect of the present disclosure can include any one or a combination of the following features:
  the armrest is deployed by a first movement in a lateral direction outwardly from the first seatback and a second movement in a longitudinal direction that is substantially perpendicular to the lateral direction; and
  the vehicle seating arrangement further includes a hip bolster that is deployable from the first seatback.

According to a third aspect of the present disclosure, a vehicle seating arrangement includes a first seat and a first seatback. A side-wing seat and a side-wing seatback extend from the first seat and the first seatback, respectively. A surface of the side-wing seat is vertically displaced from a surface of the first seat. The side-wing seat includes one or more storage areas. The side-wing seatback is longitudinally displaced from the first seatback.

Embodiments of the third aspect of the present disclosure can include any one or a combination of the following features:
  the vehicle seating arrangement further includes an air vent positioned on an inboard side of the first seat and directed rearward of the side-wing seat.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9 is a front perspective view of the vehicle seating arrangement, illustrating the storage areas, according to one embodiment;

FIG. 10A is a front perspective view of the vehicle seating arrangement, illustrating the access door, according to one embodiment;

FIG. 10B is a front perspective view of the vehicle seating arrangement, illustrating the access door, according to another embodiment;

FIG. 11A is a rear perspective view of the vehicle seating arrangement, according to one embodiment;

FIG. 11B is an expanded view taken at section XIB-XIB of FIG. 11A, illustrating the vehicle seating arrangement, according to one embodiment;

FIG. 14A is a side perspective view of the vehicle seating arrangement, illustrating the armrest in the stowed position, according to one embodiment;

FIG. 14B is a side perspective view of the vehicle seating arrangement, illustrating the armrest in the deployed position, according to one embodiment;

FIG. 15A is a side perspective view of the first row of seats, illustrating the side-wing, according to one embodiment;

FIG. 15B is a side perspective view of the first row of seats, illustrating the side-wing with the armrest in the deployed position, according to one embodiment;

FIG. 15C is a front perspective view of the first row of seats, illustrating the side-wing with the armrest and the storage areas, according to one embodiment;

FIG. 19A is a cross-sectional view of the vehicle seating arrangement and the center console taken along line XVII-XVII of FIG. 16, according to one embodiment;

FIG. 19B is a cross-sectional view of the vehicle seating arrangement and the center console taken along line XVII-XVII of FIG. 16, according to another embodiment;

DETAILED DESCRIPTION OF THE PREFERRED EMBODIMENTS

Figure 1:
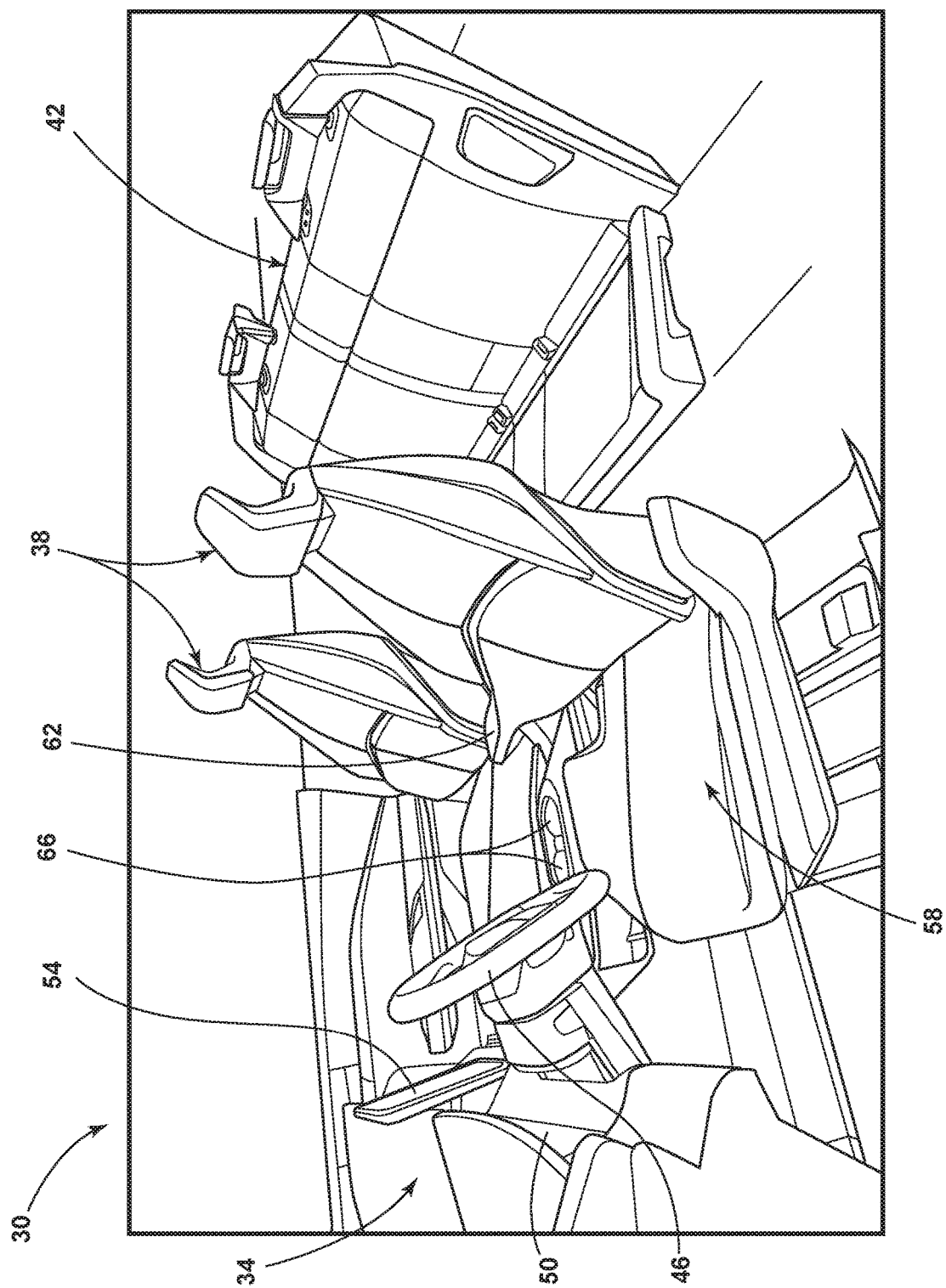
FIG. 1 is a side perspective view of a vehicle, illustrating a first and second row of seats.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating arrangement. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a vehicle is generally indicated by reference numeral 30. The vehicle 30 includes a dashboard assembly 34, a first row of seats 38, and a second row of seats 42. The dashboard assembly 34 includes a steering wheel 46, an instrument panel 50, and an entertainment interface 54. The first row of seats 38 is provided with a vehicle seating arrangement 58. The vehicle seating arrangement 58 may be equipped with an armrest 62 and one or more cup holders 66.

Figure 2:
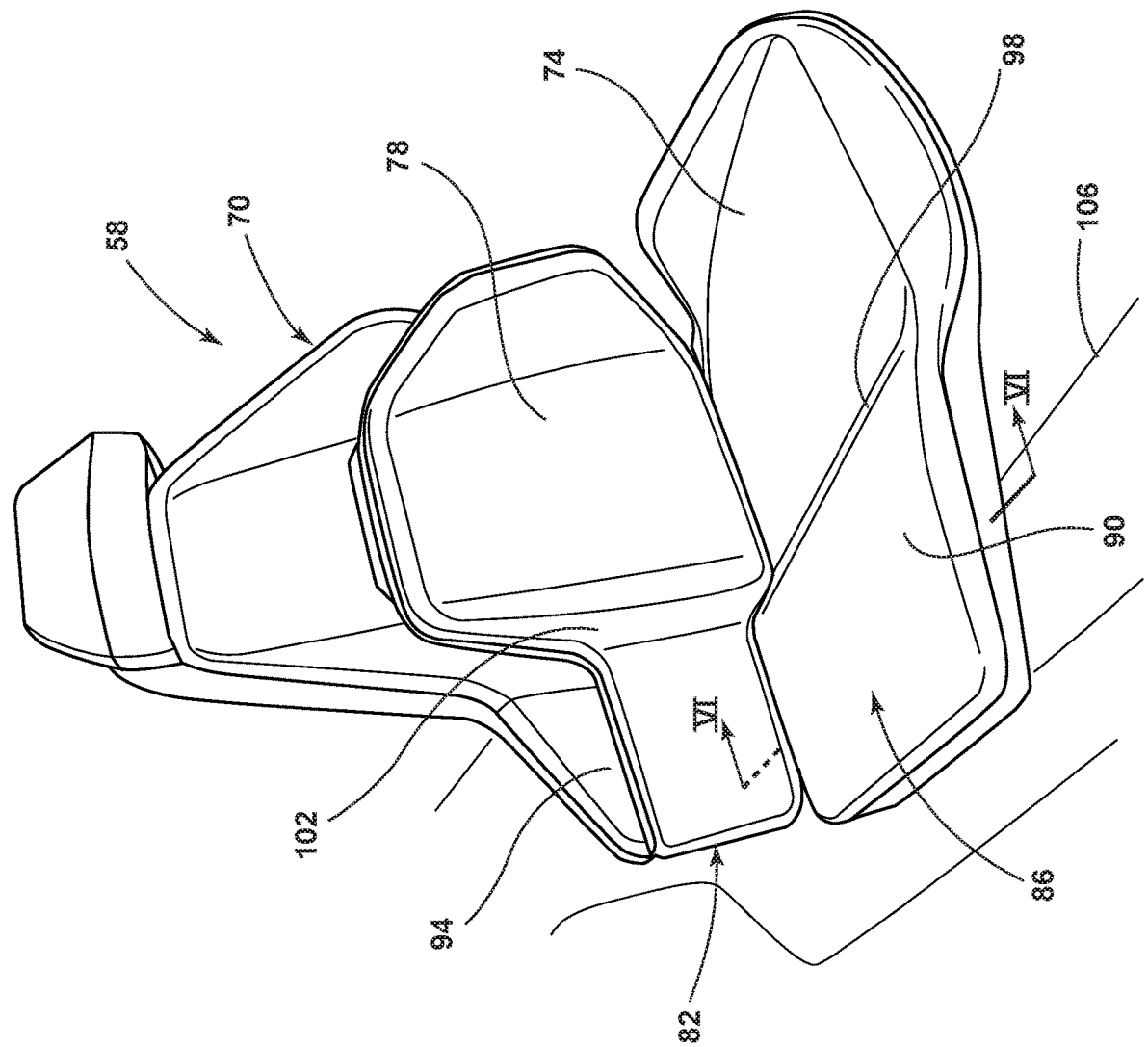
FIG. 2 is a front perspective view of a vehicle seating arrangement, illustrating a side-wing, according to one embodiment.
Figure 3:
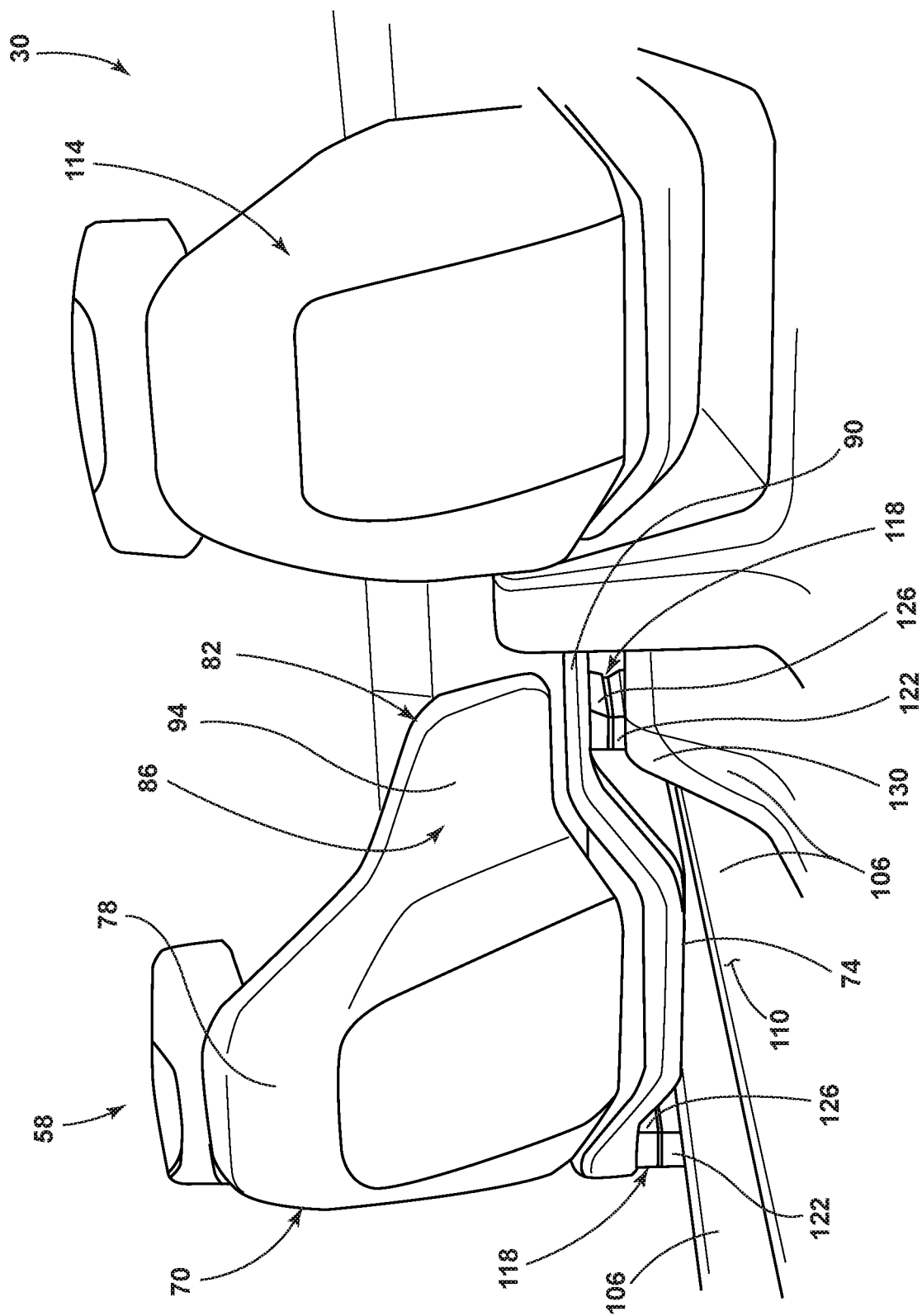
FIG. 3 is a rear perspective view of the first row of seats, illustrating the vehicle seating arrangement coupled to rails, according to one embodiment.

Referring now to FIGS. 2 and 3, the vehicle seating arrangement 58 includes a first seating assembly 70. The first seating assembly 70 is equipped with a seat 74 and a seatback 78. The seat 74 and the seatback 78 of the first seating assembly 70 may alternatively be referred to as a first seat and a first seatback, respectively. A side-wing 82 extends from the seat 74 and the seatback 78 of the first seating assembly 70 to provide a second seating assembly 86. The side-wing 82 includes a side-wing seat 90 and a side-wing seatback 94. In the depicted example, a surface of the side-wing seat 90 is vertically displaced from a surface of the seat 74. For example, the surface of the side-wing seat 90 may be vertically displaced to be above the surface of the seat 74. Alternatively, the surface of the side-wing seat 90 may be vertically displaced to be below the surface of the seat 74. The side-wing seatback 94 may be longitudinally displaced from the seatback 78. For example, the side-wing seatback 94 may be longitudinally displaced rearward of the seatback 78. Alternatively, the side-wing seatback 94 may be longitudinally displaced forward of the seatback 78. In examples where the surface of the side-wing seat 90 is vertically displaced to be above the surface of the seat 74 and the side-wing seatback 94 is longitudinally displaced to be forward of the seatback 78, an integral coupling between the first and second seating assemblies 70, 86 may provide seat bolsters 98 and seatback bolsters 102 to the first seating assembly 70. The first and second seating assemblies 70, 86 may be slidably mounted to a floor 106 of the vehicle 30 such that an area 110 of the floor 106 that is directly below the seat 74 of the first seating assembly 70 is free of engagement from components of the vehicle seating arrangement 58. A third seating assembly 114 may be positioned adjacent to the second seating assembly 86. The third seating assembly 114 may be independently operable from the first and second seating assemblies 70, 86. The third seating assembly 114 may be coupled to the floor 106 in a manner similar to the first and second seating assemblies 70, 86 that are part of the vehicle seating arrangement 58. The side-wing 82 may substantially close a gap between the second seating assembly 86 and the third seating assembly 114 so as to decrease a likelihood of an occupant losing personal items between the second and third seating assemblies 86, 114. The integral coupling of the first and second seating assemblies 70, 86 may entirely remove the likelihood of an occupant losing personal items between the first and second seating assemblies 70, 86. Additionally, the integral coupling of the first and second seating assemblies 70, 86 decreases the difficulty of an occupant sliding across the first seating assembly 70 to occupy the second seating assembly 86 and additionally decreases the difficulty experienced by an occupant of the first seating assembly 70 that is attempting to clear the second seating assembly 86 and/or a center console with a cargo item.

Referring again to FIGS. 2 and 3, the slidable coupling of the first and second seating assemblies 70, 86 to the floor 106 may be accomplished by a plurality of rails 118. The plurality of rails 118 may include a lower rail 122 that is directly coupled to the floor 106 and an upper rail 126 that is directly coupled to the vehicle seating arrangement 58. One of the plurality of rails 118 may engage with the vehicle seating assembly 58 on an outboard side of the first seating assembly 70. Another of the plurality of rails 118 may engage with a central platform 130 in the floor 106 that is located below the side-wing seat 90. Accordingly, the first seating assembly 70 may be entirely suspended above the floor 106 between the outboard side of the first seating assembly 70 and the central platform 130. In the depicted embodiment, the plurality of rails 118 includes two rails, however, it is contemplated that greater or fewer rails 118 may be employed without departing from the concepts disclosed herein.

Figure 4:
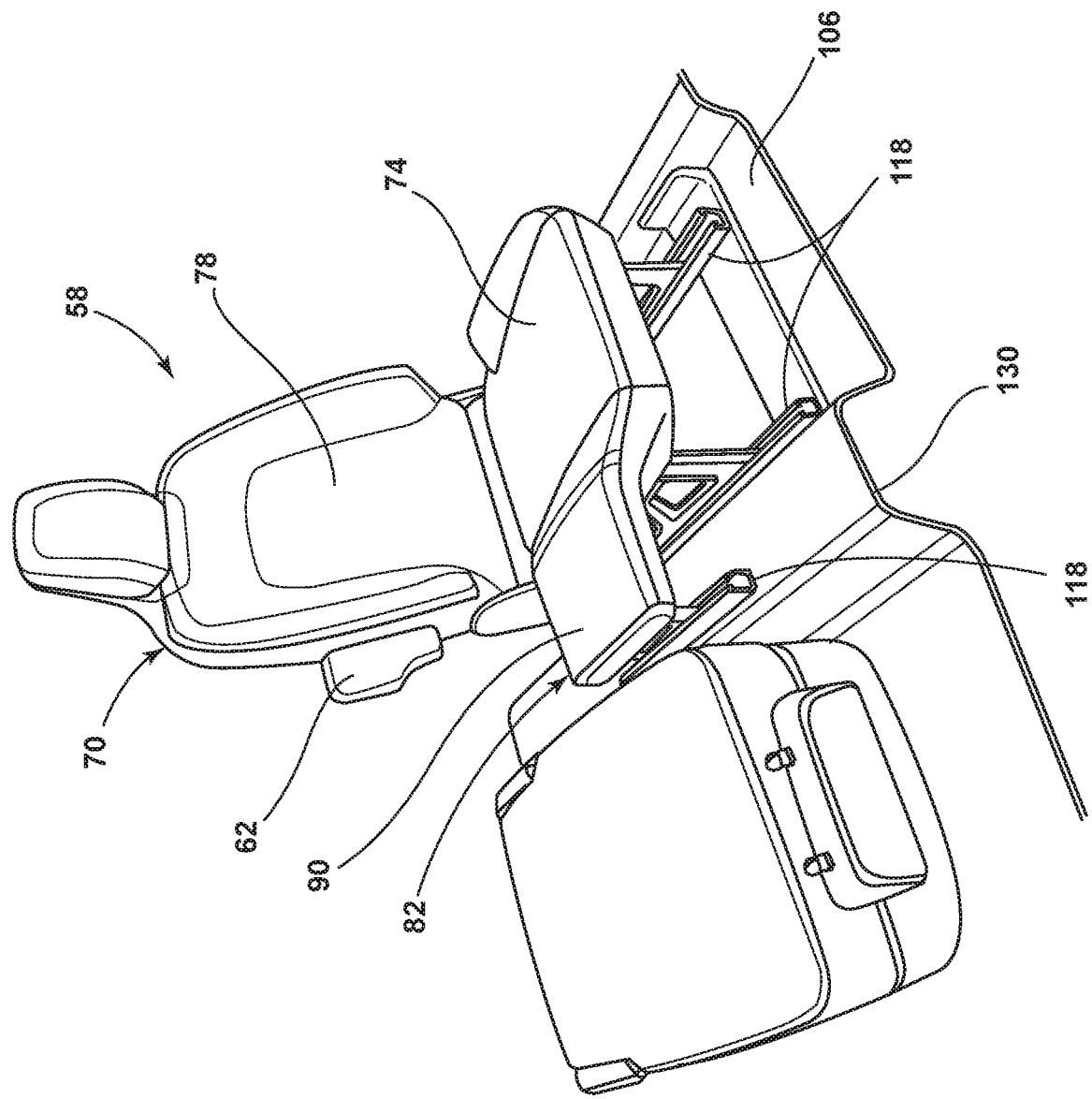
FIG. 4 is a front perspective view of the vehicle seating arrangement, illustrating the vehicle seating arrangement coupled to rails, according to another embodiment.

Referring to FIG. 4, the vehicle seating arrangement 58 may be coupled to the floor 106 by the plurality of rails 118. In the depicted embodiment, the plurality of rails 118 includes three rails that are utilized to slidably couple the vehicle seating arrangement 58 to the floor 106. Two of the rails 118 are coupled to an underside of the seat 74 of the first seating assembly 70. A third one of the rails 118 operably couples the side-wing 82 to the central platform 130 in the floor 106 such that the side-wing 82 is supported by at least one of the rails 118. For example, the side-wing 82 may be supported by the rail 118 that is positioned on the central platform 130 and may additionally be supported at least partially by the rail 118 that is coupled to the seat 74 on an inboard side of the first seating assembly 70. In the depicted example, the side-wing 82 includes the side-wing seat 90 but may not include the side-wing seatback 94. As the side-wing seatback 94 is not included, the armrest 62 may be operably coupled to the seatback 78 of the first seating assembly 70. The armrest 62 may be pivotably coupled to the seatback 78 and operable between a stowed position and a deployed position. The stowed position of the armrest 62 may be generally vertical and parallel with the seatback 78 while the deployed position of the armrest 62 may be a generally horizontal position that is roughly parallel with the seat 74. Deployment of the armrest 62 from the stowed position may be accomplished by rotational motion about a pivot axis of the armrest 62 in either vehicle forward or vehicle rearward directions. When the armrest 62 is pivoted in the vehicle rearward direction, the armrest 62 may be utilized by passengers seated rearward of the first row of seats 38 as a surface to place items upon or generally utilized for the passengers desired purpose.

Figure 5:
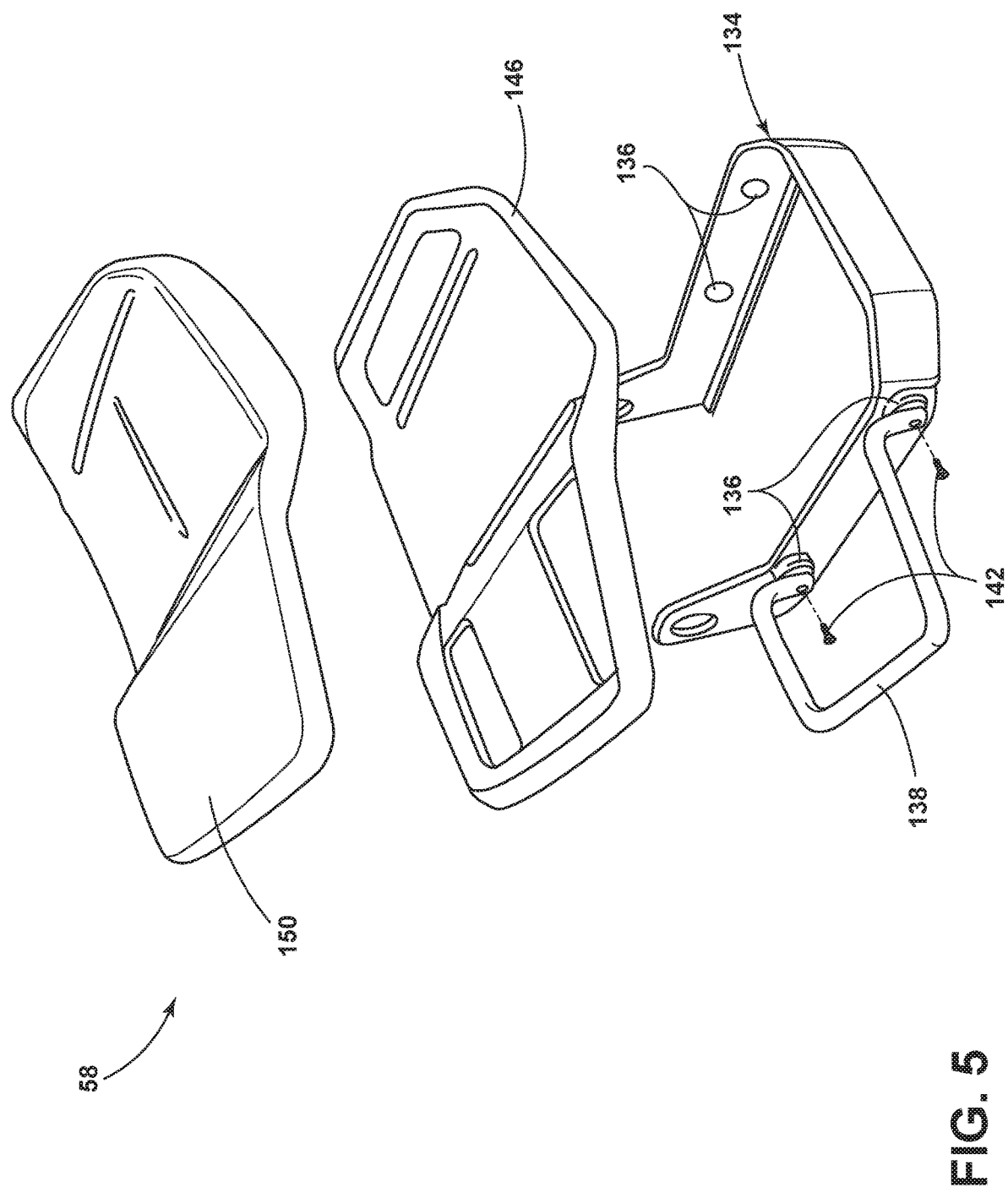
FIG. 5 is an exploded view of a side-wing seat of the side-wing, illustrating a seat frame, a side-wing support tube, a seat carrier, and a seat cushion material, according to one embodiment.

Referring now to FIG. 5, the seat frame 134 for the first seating assembly 70 may include apertures 136 that are configured to permit the optional installation of a side-wing support tube 138. Accordingly, the seat frame 134 for the first seating assembly 70 may be utilized on vehicle seating arrangements that include or omit the side-wing 82. The side-wing support tube 138 may be operably coupled to the apertures 136 in the seat frame 134 by one or more fasteners 142. A seat carrier 146 may be coupled to an upper side of the seat frame 134 and the side-wing support tube 138. The seat carrier 146 may define the intended contours of the vehicle seating arrangement 58. Additionally or alternatively, the seat carrier 146 may include contours that enable additional functionality to be selectively coupled to the vehicle seating arrangement 58 as will be described in further detail below. The shape of the side-wing support tube 138 may compliment and/or generally allow for the coupling of the additional functionalities to the vehicle seating arrangement 58. A seat cushion material 150 may couple to an upper side of the seat carrier 146 to provide cushion, support, and comfort to an occupant of the vehicle seating arrangement 58. The seatback 78 and the side-wing seatback 94 may be configured similarly to the seat 74 and side-wing seat 90 as described in the preceding paragraph.

Figure 6:
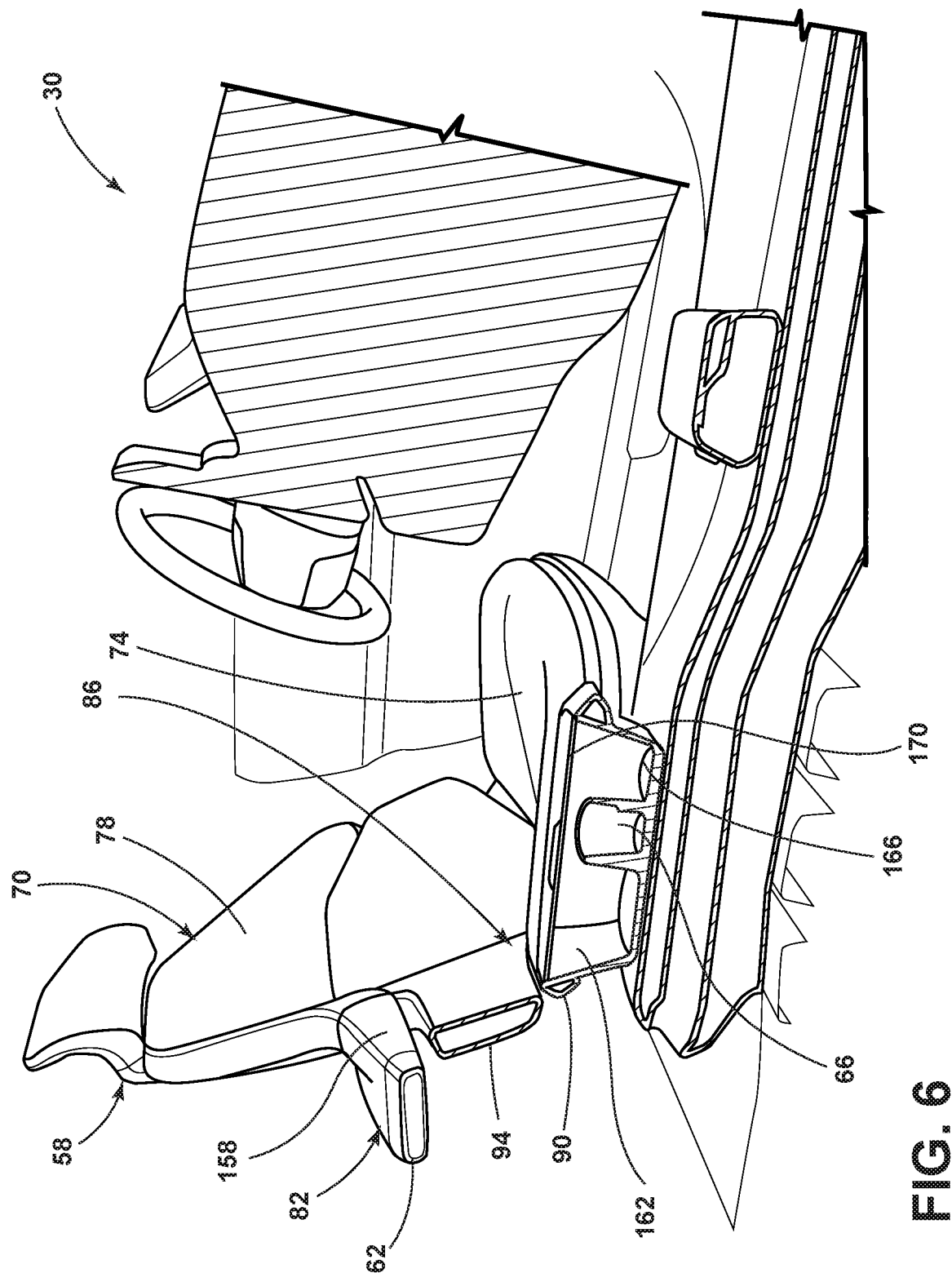
FIG. 6 is a cross-sectional view taken along line VI-VI of FIG. 2, illustrating an armrest and storage areas, according to one embodiment.

Referring to FIG. 6, the vehicle 30 and the vehicle seating arrangement 58 are shown in a cross-sectional view taken along line VI-VI of FIG. 2. In the depicted example, the armrest 62 is separated from the side-wing seatback 94. The armrest 62 is integrally formed with the seatback 78 and extends in a longitudinal direction that is generally parallel with the side-wing seat 90. In some examples, the armrest 62 may extend rearward beyond a rearward surface of the seatback 78. A front surface 158 of the armrest 62 may be utilized as at least a portion of the side-wing seatback 94 while being a separate element from the side-wing seatback 94. Said another way, the armrest 62 may serve more than one purpose depending on an occupation status of the second seating assembly 86. For example, when the second seating assembly 86 is unoccupied, then an occupant of the first seating assembly 70 may utilize the armrest 62 as an armrest. When the second seating assembly 86 is occupied, the armrest 62 may support a back of the occupant in a middle or upper region of the occupant's back while the side-wing seatback 94 supports a lower or lumbar portion of the occupant's back. It is contemplated that in some examples the armrest 62 may be utilized simultaneously by occupants of the first and second seating assemblies 70, 86. The side-wing seat 90 may be provided with at least one storage area. For example, the storage areas provided in the side-wing seat 90 may include, but are not limited to, a storage bin 162, the one or more cup holders 66, a media storage area 166, and combinations thereof. In some examples, the storage bin 162 and the media storage area 166 may be interconnected around the cup holder 66 such that a larger storage area is provided with a variety of storage locations that have varying sizes. It is further contemplated that instead of the media storage area 166, the storage area may alternatively be one of the cup holders 66 that is provided with a different size or diameter to accommodate beverage containers of various sizes. The storage areas positioned within the side-wing seat 90 may be covered by an access door 170. The access door 170 may be flexible, rigid, or a combination of flexible and rigid. In one example, the access door 170 may be a cloth-covered tabour door. In various examples, the access door 170 may be retractably coupled to the side-wing seat 90. Alternatively, the access door 170 may be hingedly coupled to the side-wing seat 90.

Figure 7A:
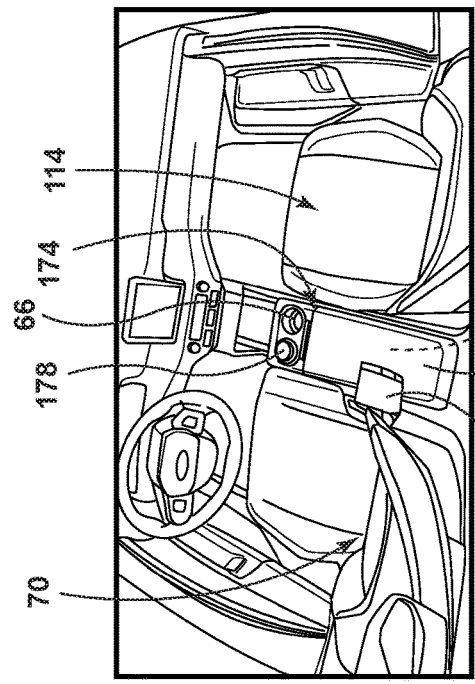
FIG. 7A is a top perspective view of the first row of seats, illustrating the vehicle seating arrangement and a center console, according to one embodiment.
Figure 7B:
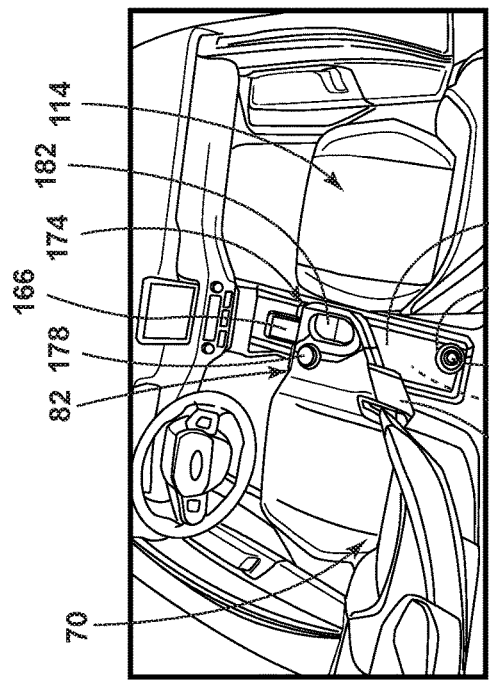
FIG. 7B is a top perspective view of the first row of seats, illustrating the vehicle seating arrangement and the center console, according to another embodiment.
Figure 7C:
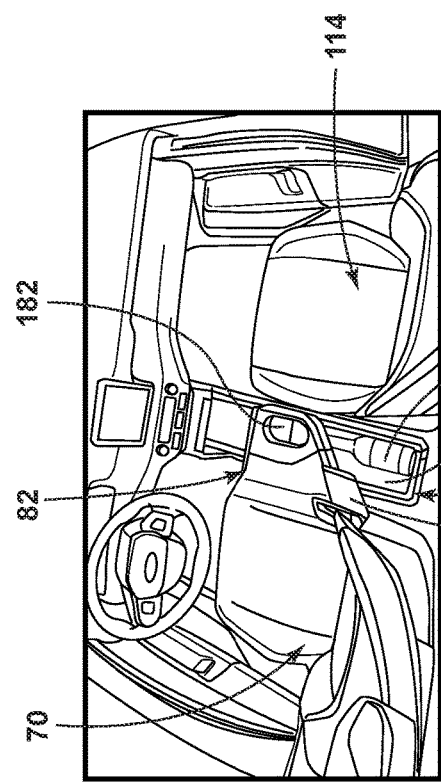
FIG. 7C is a top perspective view of the first row of seats, illustrating the vehicle seating arrangement and the center console, according to one embodiment.
Figure 8:
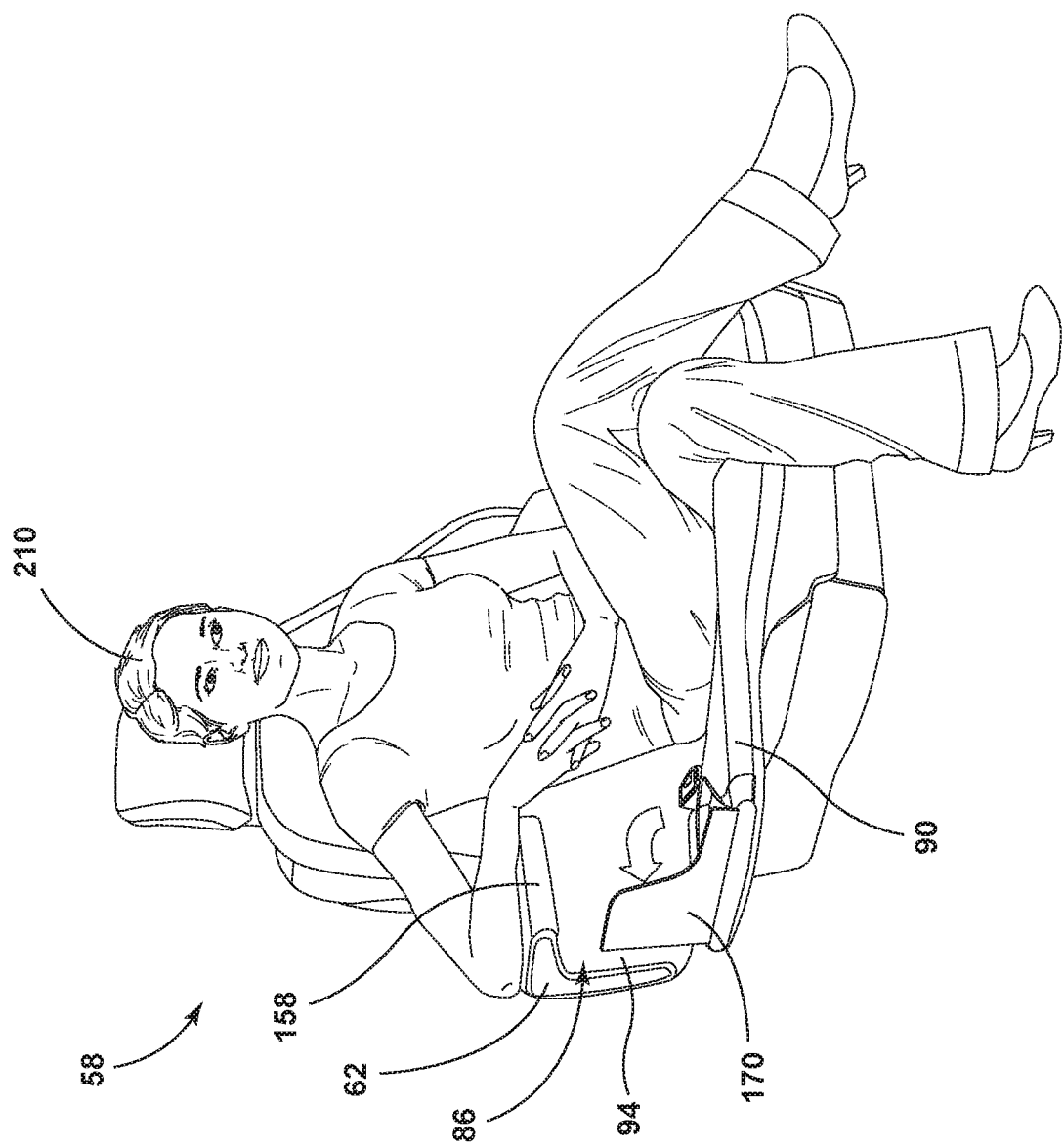
FIG. 8 is a front perspective view of the vehicle seating arrangement, illustrating an occupant utilizing the armrest and an access door to the storage areas in an open position.

Referring to FIGS. 7A-7C, the side-wing 82 may travel over a center console 174 rather than being equipped with the side-wing seat 90 and the side-wing seatback 94 (FIG. 2). In some examples, the side-wing 82 may be omitted such that the first seating assembly 70 travels independently from the second seating assembly 86 and/or the third seating assembly 114, such as the example depicted in FIG. 7B. The first seating assembly 70 may be equipped with the armrest 62 regardless of whether the side-wing 82 is employed. The armrest 62 extends outward from the first seating assembly 70 and may generally travel over the center console 174 as the first seating assembly 70 is actuated in a longitudinal direction. The side-wing 82 and/or the center console 174 may be equipped with a shifter knob 178, a quick-access storage compartment 182, the one or more cup holders 66, the media storage area 166, and/or combinations thereof. The center console 174 may include the storage bin 162, which may be covered by the access door 170. The access door 170 may include a tall-item aperture 186 that allows the access door 170 to be in a closed position while retaining a tall item, such as a beverage bottle 190. In some examples, the storage bin 162 may be provided with conditioned air (e.g. heated or cooled) or generally provided with a temperature-controlled environment such that items stored within the storage bin 162 may be kept warm or cool.

Referring now to FIGS. 8-10B, the access door 170 and the storage areas covered by the access door 170 are shown according to various examples. The access door 170 may be rigid (FIG. 8), flexible, or a combination of rigid and flexible (FIG. 9). The access door 170 may close over the storage areas in the side-wing seat 90 in a variety of ways. For example, the access door may be hingedly coupled to an inboard side of the second seating assembly 86 and may be generally supported by a support structure 194. In some examples, the support structure 194 that supports the access door 170 when the access door 170 is in a closed position may be the seat carrier 146. The access door 170 may be provided with one or more living hinges 198. The living hinges 198 may be separated by rigid panels 202. The access door 170 may be a flexible material that is hingedly coupled to an inboard side of the second seating assembly 86. The hinged coupling of the access door 170 may be accomplished in a variety of ways including, but not limited to, sewing the access door 170 to the side-wing seat 90, providing a living hinge at the joining of the access door 170 to the side-wing seat 90, providing a conventional hinge at the junction of the access door 170 with the side-wing seat 90, or any other suitable hinged coupling.

Referring again to FIGS. 8-10B, in some examples, the access door 170 may be sealably coupled to the side-wing seat 90 at a location that is removed from the inboard side where the access door 170 is hingedly coupled to the side-wing seat 90. The sealable coupling may be accomplished with magnets, push-push mechanisms, and/or one or more zipper assemblies 206. In examples that utilize more than one zipper assembly 206 a tall item such as the beverage bottle 190 may be retained by partially closing the zipper assemblies 206 around the beverage bottle 190. Accordingly, the tall-item aperture 186 may be created by the selective actuation of the zipper assemblies 206. In embodiments where a single zipper assembly 206 is utilized, the tall-item aperture 186 may still be created by the selective actuation of the zipper assembly 206. However, having a single zipper assembly 206 may limit the possible locations of the tall-item aperture 186 to an area proximal a fully closed position of the zipper assembly 206 (FIG. 10A). The examples where more than one zipper assembly 206 is utilized (FIG. 10B) allow a user to position the tall-item aperture 186 at a desired location. The storage areas that are covered by the access door 170 may include the one or more cup holders 66, the storage bin 162, the media storage area 166, and/or combinations thereof. The access door 170 may be provided with enough support from the support structure 194 that the access door 170 may support the weight of an occupant sitting in the second seating assembly 86. In examples where the access door 170 is flexible, the access door 170 may be padded to provide comfort to the occupant of the second seating assembly 86 and to prevent the occupant of the second seating assembly 86 from feeling the contours or structures of the storage areas housed within the side-wing seat 90. The armrest 62 may be integrally and permanently formed in the side-wing seatback 94 such that the armrest 62 is a rigid assembly. In the example depicted in FIG. 8, the armrest 62 extends vehicle forward of the side-wing seatback 94 to at least partially extend over the side-wing seat 90 such that the armrest 62 is generally parallel to the side-wing seat 90. In such an example, the front surface 158 of the armrest 62 may serve as a back support for the occupant of the second seating assembly 86. The vertical positioning of the armrest 62 may take into account a comfort level of an occupant 210 of the first seating assembly 70 while also taking into consideration the comfort and safety of an occupant of the second seating assembly 86.

Referring now to FIGS. 11A and 11B, the vehicle seating arrangement 58 includes the side-wing seat 90 and the armrest 62. In the depicted examples, the side-wing seatback 94 is omitted. Accordingly, the depicted example may also omit the second seating assembly 86. Alternatively, the armrest 62 may be configured to serve the dual purpose of the armrest 62 and the side-wing seatback 94. The side-wing seat 98 may include an accessory-carrying portion 214 that is positioned such that the side-wing seat 90 is in between the seat 74 of the first seating assembly 70 and the accessory-carrying portion 214. The accessory-carrying portion 214 may be equipped with the one or more cup holders 66. The one or more cup holders 66 may be covered by a retractable cover, which may be similar to the access door 170, such that the cup holders 66 may be selectively revealed by a user.

Figure 12C:
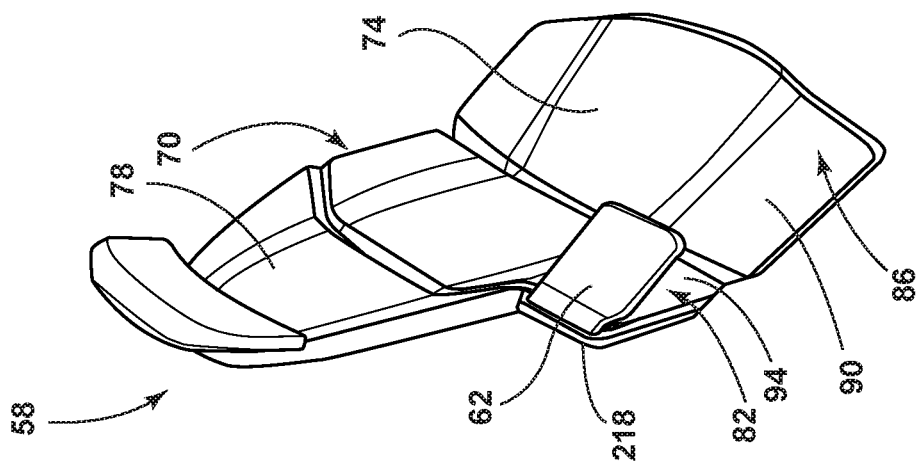
FIG. 12C is a top perspective view of the vehicle seating arrangement, illustrating the armrest in a deployed position, according to one embodiment.
Figure 12B:
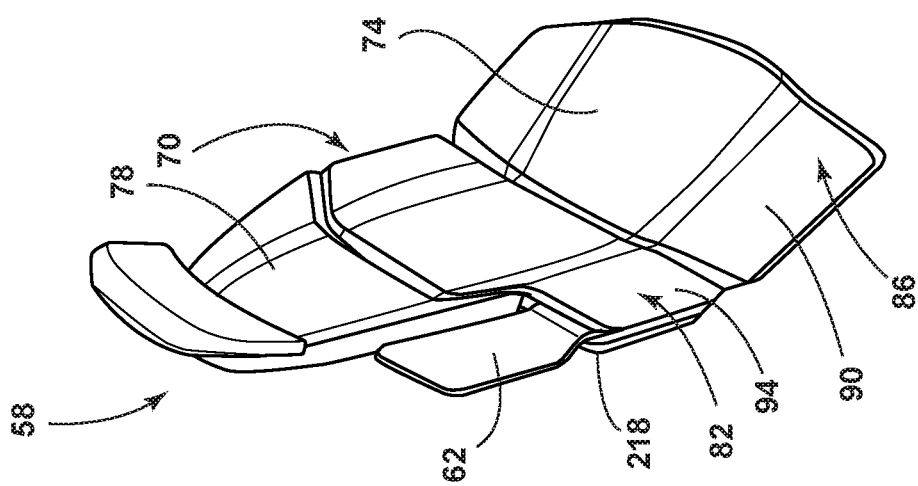
FIG. 12B is a top perspective view of the vehicle seating arrangement, illustrating the armrest in an upwardly-extend position, according to one embodiment.
Figure 12A:
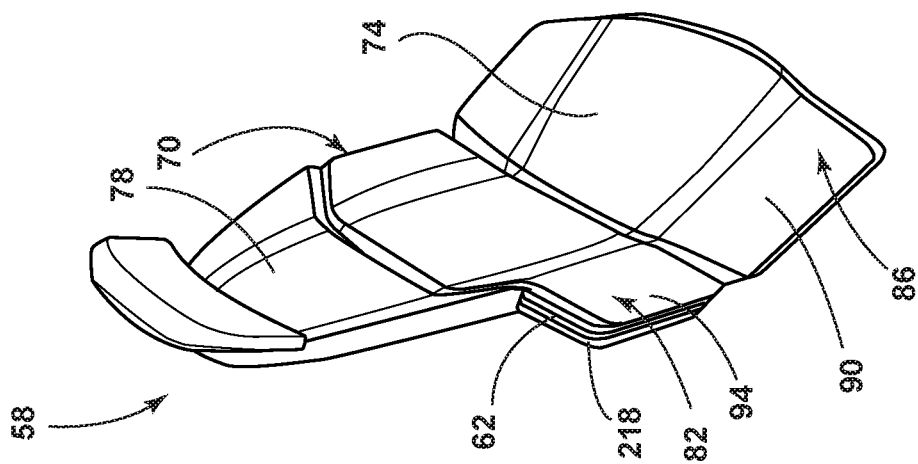
FIG. 12A is a top perspective view of the vehicle seating arrangement, illustrating the armrest in a stowed position, according to one embodiment.
Figure 13A:
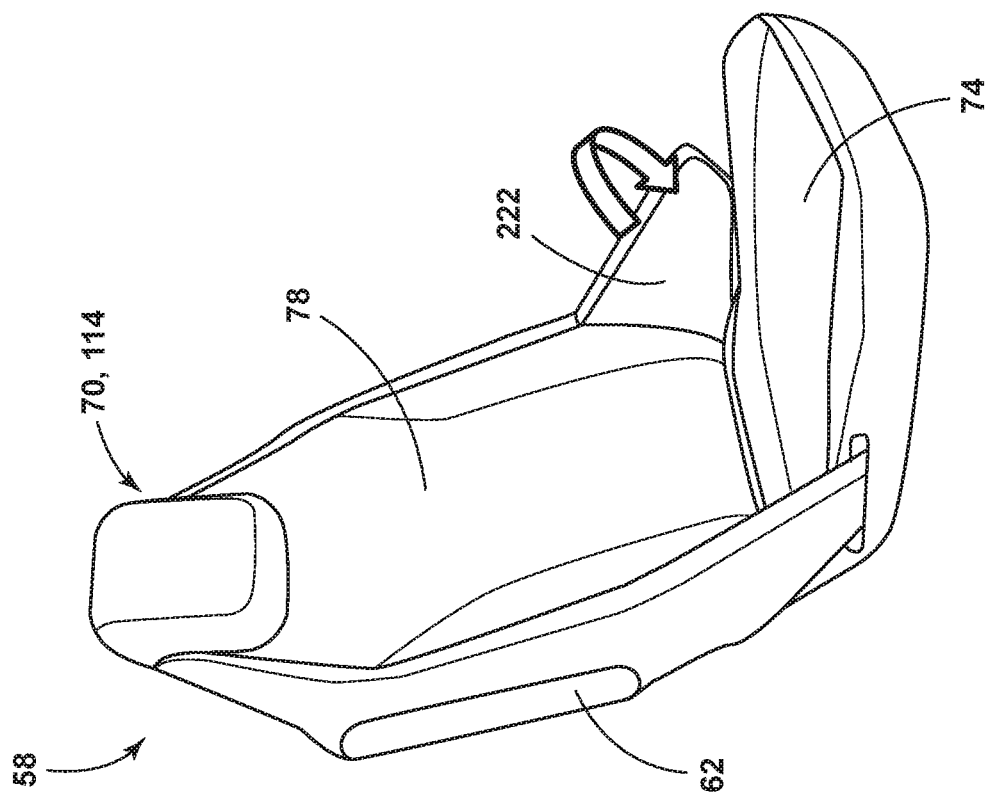
FIG. 13A is a side perspective view of the vehicle seating arrangement, illustrating the armrest in the stowed position and a hip bolster in a retracted position, according to one embodiment.
Figure 13B:
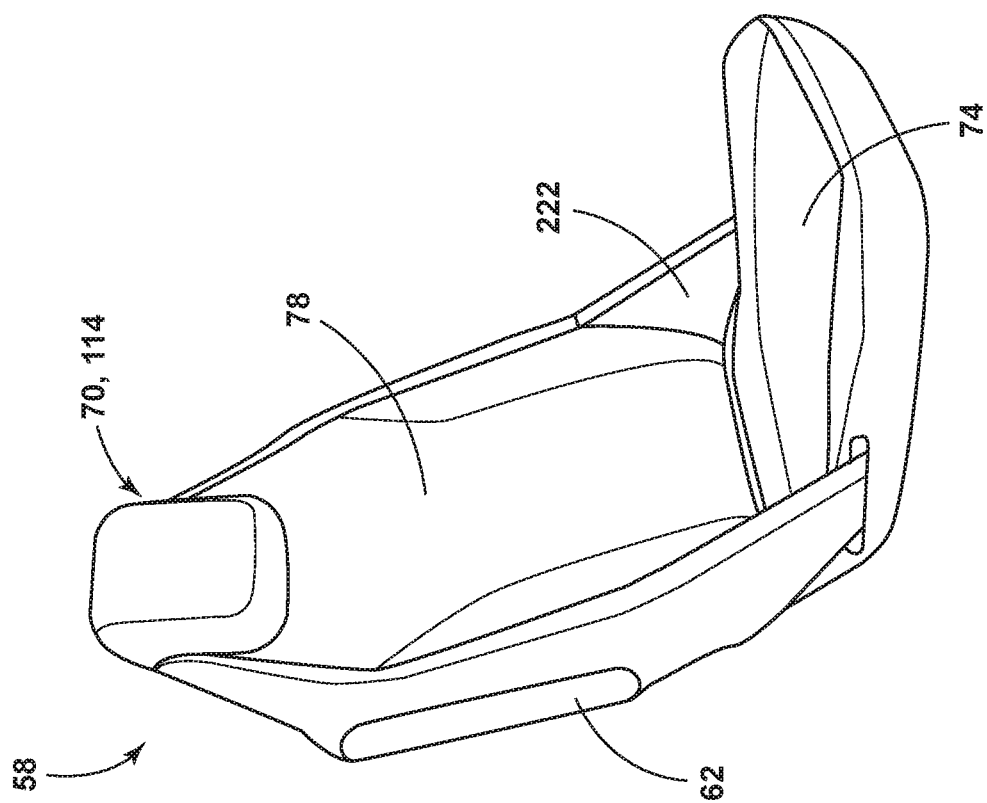
FIG. 13B is a side perspective view of the vehicle seating arrangement, illustrating the armrest in the stowed position and the hip bolster in an extended position, according to one embodiment.

Referring to FIGS. 12A-12C, the vehicle seating assembly 58 is equipped with the first seating assembly 70 and the second seating assembly 86. The side-wing 82 includes the side-wing seat 90 and the side-wing seatback 94, which extend from the seat 74 and the seatback 78, respectively. The armrest 62 is deployable from the side-wing seatback 94. In the depicted embodiment, the armrest 62 is deployable from the side-wing seatback 94 by rotating the armrest 62 in a vertical direction out of an upper portion 218 of the side-wing seatback 94 (FIG. 12B) followed by rotation of the armrest 62 in a downward direction such that the armrest 62 assumes a generally horizontal position that may be substantially parallel to the side-wing seat 90 (FIG. 12C).

Referring to FIGS. 13A-14B, the vehicle seating arrangement 58 includes the seat 74 and the seatback 78. The vehicle seating arrangement 58 depicted may be the first seating assembly 70 and/or the third seating assembly 114. The vehicle seating arrangement 58 may include a hip bolster 222 that is deployable. The deployable hip bolster 222 may be positioned on an outboard side of the vehicle seating arrangement 58 such that the hip bolster 222 may be actuated between a retracted position (FIG. 13A) and an extended position (FIG. 13B). By providing the ability to actuate the hip bolster 222 between the retracted position and the extended position, the difficulty with which a user is presented during ingress and/or egress from the vehicle seating arrangement 58 may be substantially decreased by having the hip bolster 222 in the retracted position when the user is entering or leaving the vehicle 30. During operation of the vehicle 30 and/or during vehicle maneuvers the hip bolster 222 may be selectively or automatically actuated to the extended position to provide increased lateral support to an occupant of the first and/or third seating assemblies 70, 114. The hip bolster 222 may be operably coupled to one or more of the seat 74 and the seatback 78. Accordingly, the hip bolster 222 may be deployable from either the seat 74 or the seatback 78. It is contemplated that in some examples the hip bolster 222 may be deployed from both the seat 74 and the seatback 78. The armrest 62 in the depicted example is deployable from the seatback 78. The armrest 62 may be deployed from the seatback 78 by a first movement 226 in a lateral direction outwardly from the seatback 78 and a second movement 230 in a longitudinal direction that is substantially perpendicular to the lateral direction. Upon actuation of the armrest 62 laterally and longitudinally from the seatback 78, the armrest may be presented to an occupant of the first seating assembly 70 for use and the armrest 62 may be generally parallel to the seat 74.

Referring now to FIGS. 15A-15C, the vehicle seating arrangement 58 is shown as a component of the first row of seats 38 of the vehicle 30. The first row of seats 38 includes the first seating assembly 70, the second seating assembly 86, and the third seating assembly 114. The second seating assembly 86 includes the side-wing seat 90 and the side-wing seatback 94. In the examples depicted in FIGS. 15A and 15B, the side-wing seatback 94 may become the armrest 62 upon rotational actuation in an upward direction away from the remainder of the side-wing seatback 94. Said another way, the armrest 62 is deployable from the side-wing seatback 94 by rotational motion away from the side-wing seatback 94 in the upward direction. The seat cushion material 150 of the side-wing seat 90 may be configured for retractable actuation of the side-wing seat 90 away from a forward extreme 234 of the second seating assembly 86. Actuation of the side-wing seat 90 in a rearward direction away from the forward extreme 234 may reveal the one or more storage areas that are positioned below the side-wing seat 90. The one or more storage areas positioned below the side-wing seat 90 may include, but are not limited to, the one or more cup holders 66 and the storage bin 162. Accordingly, the side-wing seat 90 may serve a dual purpose as the access door 170 to the storage areas positioned below the side-wing seat 90 and the seat portion of the second seating assembly 86. In the example depicted in FIG. 15C, the side-wing seatback 94 may be rotated in the upward direction for use as the armrest 62 and thereby create a front-to-back aperture 238 such that access between the first row of seats 38 and rearward rows of seats (e.g., the second row of seats 42) may be enabled. The front-to-back aperture 238 may allow passengers to pass items between one another or may allow for the storage of large items in the longitudinal direction along a travel axis of the vehicle 30 by inserting the large or long item through the front-to-back aperture 238. The front-to-back aperture 238 may also correspond with rearward cargo access points, such as similar apertures in the second row of seats 42, and/or generally aligning with a cargo area of the vehicle 30.

Figure 16:
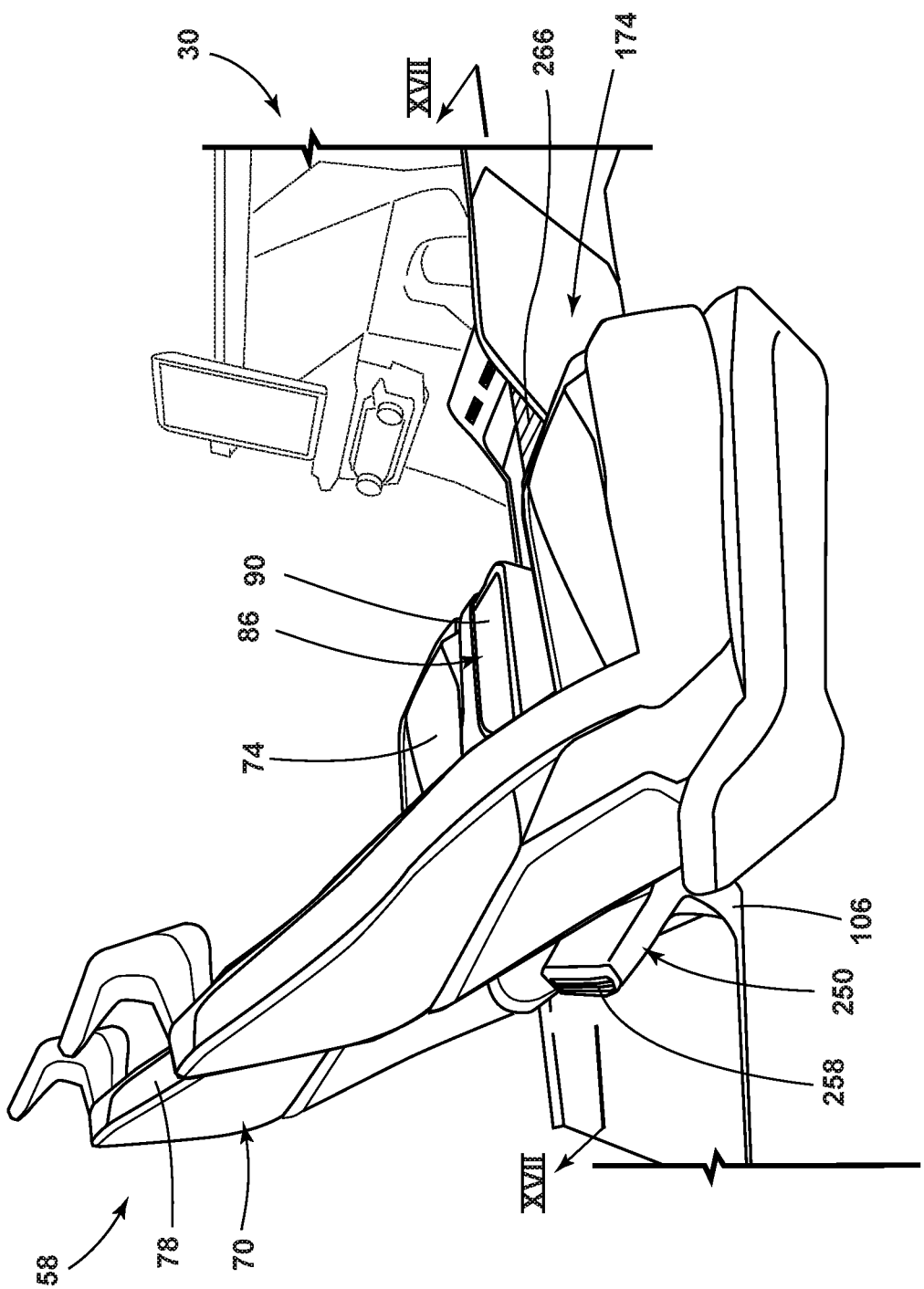
FIG. 16 is a side view of the vehicle seating arrangement, illustrating the center console, according to one embodiment.
Figure 17:
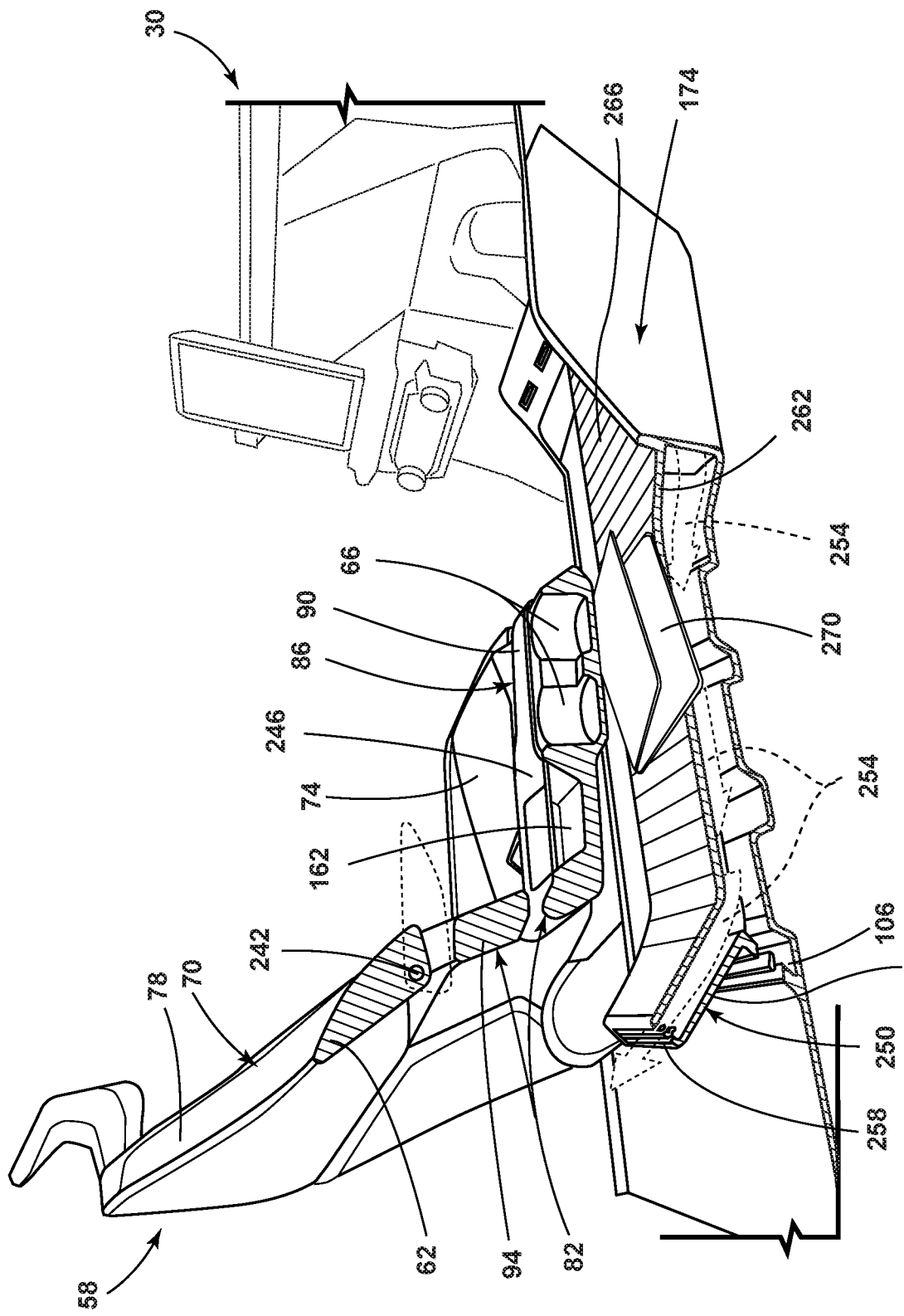
FIG. 17 is a cross-sectional view of the vehicle seating arrangement and the center console taken along line XVII-XVII of FIG. 16, according to one embodiment.
Figure 18:
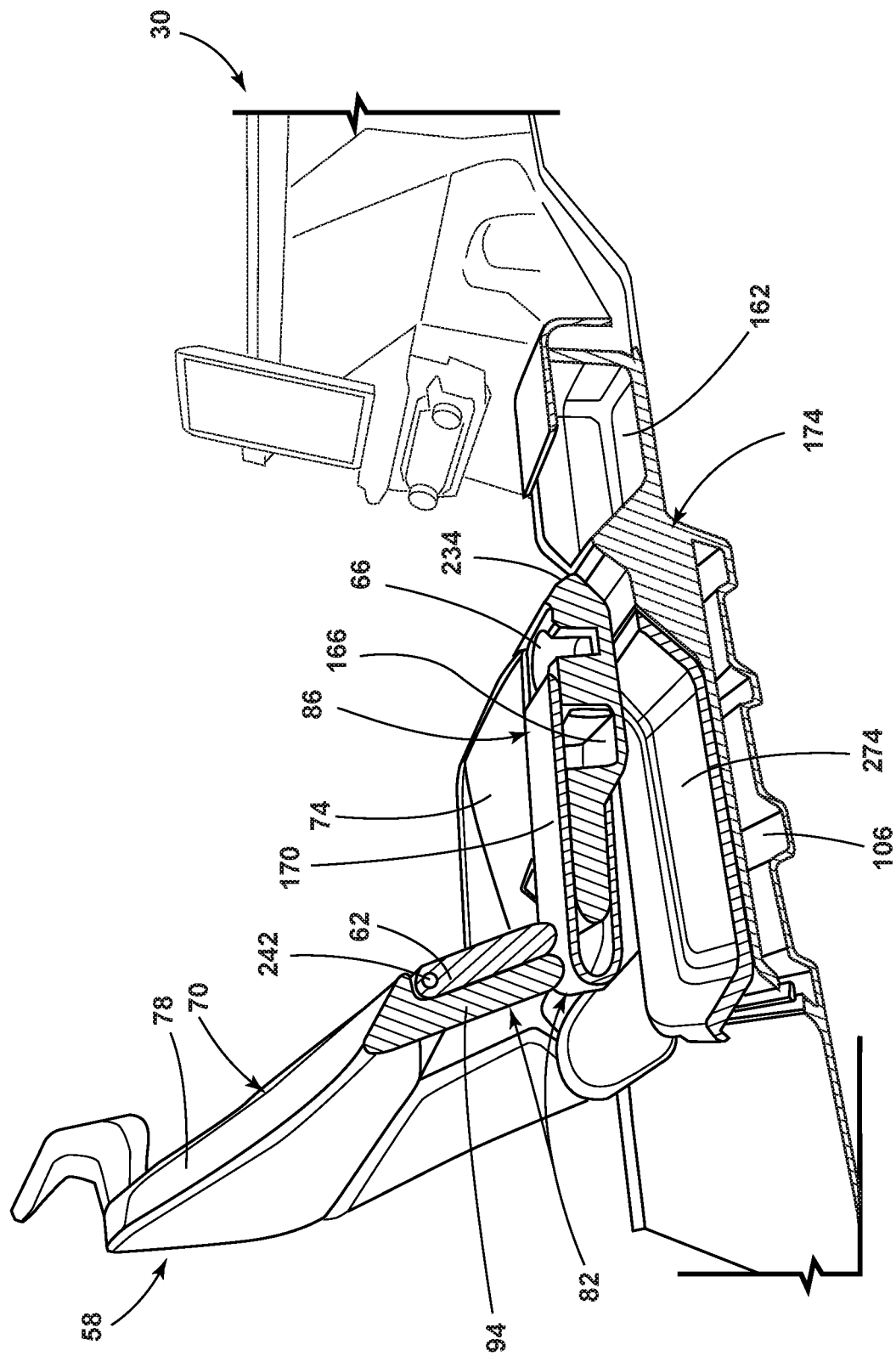
FIG. 18 is a cross-sectional view of the vehicle seating arrangement and the center console taken along line XVII-XVII of FIG. 16, according to another embodiment.

Referring now to FIGS. 16-18, the vehicle seating arrangement 58 is shown with the side-wing seat 90 and the side-wing seatback 94 extending from the seat 74 and a seatback 78, respectively. The armrest 62 is coupled to the seatback 78 of the first seating assembly 70 (FIG. 17) or the side-wing seatback 94 (FIG. 18). Regardless of where the armrest is coupled to the first and/or second seating assemblies 70, 86, the armrest 62 may be coupled in a pivotable manner such that the armrest 62 may rotate about a pivot axis 242. The armrest 62 may pivot in a downward direction from a stowed position to a deployed position (shown in phantom), as shown in FIG. 17. Alternatively, the armrest 62 may pivot in an upward direction, away from the side-wing seatback 94 from the stowed position to the deployed position, as shown in FIG. 18. When the armrest 62 is in the stowed position, the armrest 62 may be utilized by an occupant of the second seating assembly 86 as at least a portion of the side-wing seatback 94. Accordingly, the armrest 62 may be utilized for support in either the stowed or the deployed positions. The side-wing seat 90 may be equipped with a variety of storage areas. For example, the storage areas may include, but are not limited to, the one or more cup holders 66, the storage bin 162, the media storage area 166, and/or combinations thereof. The storage areas may be covered by a variety of closures, such as the access door 170. As with examples previously described herein, the access door 170 may be rigid, flexible, or a combination of rigid and flexible. In various examples, the access door 170 may be retractably coupled to the side-wing seat 90 (FIG. 18). Alternatively, the storage areas may be open at all times for use by an occupant (FIG. 17). In such an example, a cover 246 may be coupled to an upper surface of the side-wing seat 90 and contoured to the storage areas. It is contemplated that the cover 246 may at least partially extend over some of the storage areas (e.g., see the storage bin 162 in FIG. 17).

Referring again to FIGS. 16-18, the side-wing 82 is coupled to the first seating assembly 70 such that translational motion of the first seating assembly 70 results in corresponding translational motion of the side-wing 82. The side-wing 82 may travel over the center console 174 without coming into contact with the center console 174. The center console 174 may include heating ventilation and air conditioning (HVAC) plumbing 250 that directs conditioned air 254 rearward in the vehicle 30 out of one or more HVAC outlets 258. The HVAC plumbing 250 may be pre-fabricated plumbing. Alternatively, the HVAC plumbing 250 may be defined, at least partially, by the floor 106 of the vehicle 30 and an upper structure 262 of the center console 174. The HVAC outlet 258 may be directed toward a seatback of a rearward seating assembly. Accordingly, the HVAC plumbing 250 may be sloped in an upward direction as the HVAC plumbing 250 approaches the second row of seats 42 (FIG. 1). The HVAC plumbing 250 may include a lower structure 264 that is coupled to the floor 106 and defines a lower extent of the HVAC plumbing 250 as the HVAC plumbing 250 begins to slope in the upward direction. A top surface 266 of the upper structure 262 may be utilized by an occupant to store one or more cargo items 270 thereon. In some examples, the center console 174 may include a rear-access storage area 274. The rear-access storage area 274 may be positioned at a rearward end of the center console 174 and be accessible to passengers seated rearward of the center console 174. The rear-access storage area 274 may also be at least partially accessible to occupants in the first row of seats 38. For example, when the forward extreme 234 of the vehicle seating arrangement 58 is positioned rearward of a forward wall of the rear-access storage area 274 an occupant of the first row of seats 38 may access the rear-access storage area 274.

Referring to FIGS. 19A and 19B, the armrest 62 of the vehicle seating arrangement 58 may define the side-wing seatback 94 such that actuation of the armrest 62 to a deployed position may create the front-to-back aperture 238 described above. The armrest 62 may be pivotable about the pivot axis 242 to a forward-deployed and/or a rearward-deployed position, as shown in phantom. The side-wing seat 90 may be equipped with the one or more cup holders 66, the media storage bin 166, additional storage solutions, and/or combinations thereof. The side-wing seat 90 may be provided with the access door 170 to provide selective access to the storage areas housed within the side-wing seat 90. As described above, the access door 170 may be rigid, flexible, or a combination of rigid and flexible. The access door 170 may also be retractably coupled to the side-wing seat 90. The center console 174 may be equipped with the storage bin 162, the HVAC plumbing 250, and/or the rear-access storage area 274. The storage bin 162 may be provide with a lid 278. The lid 278 may be actuatable between an open and a closed position to selectively grant access to the storage bin 162. The conditioned air 254 exits from the HVAC outlet 258. In some examples, the HVAC outlet 258, or air vent, may be positioned on an inboard side 282 of the first seating assembly 70 and directed rearward of the second seating assembly 86.

Figure 20:
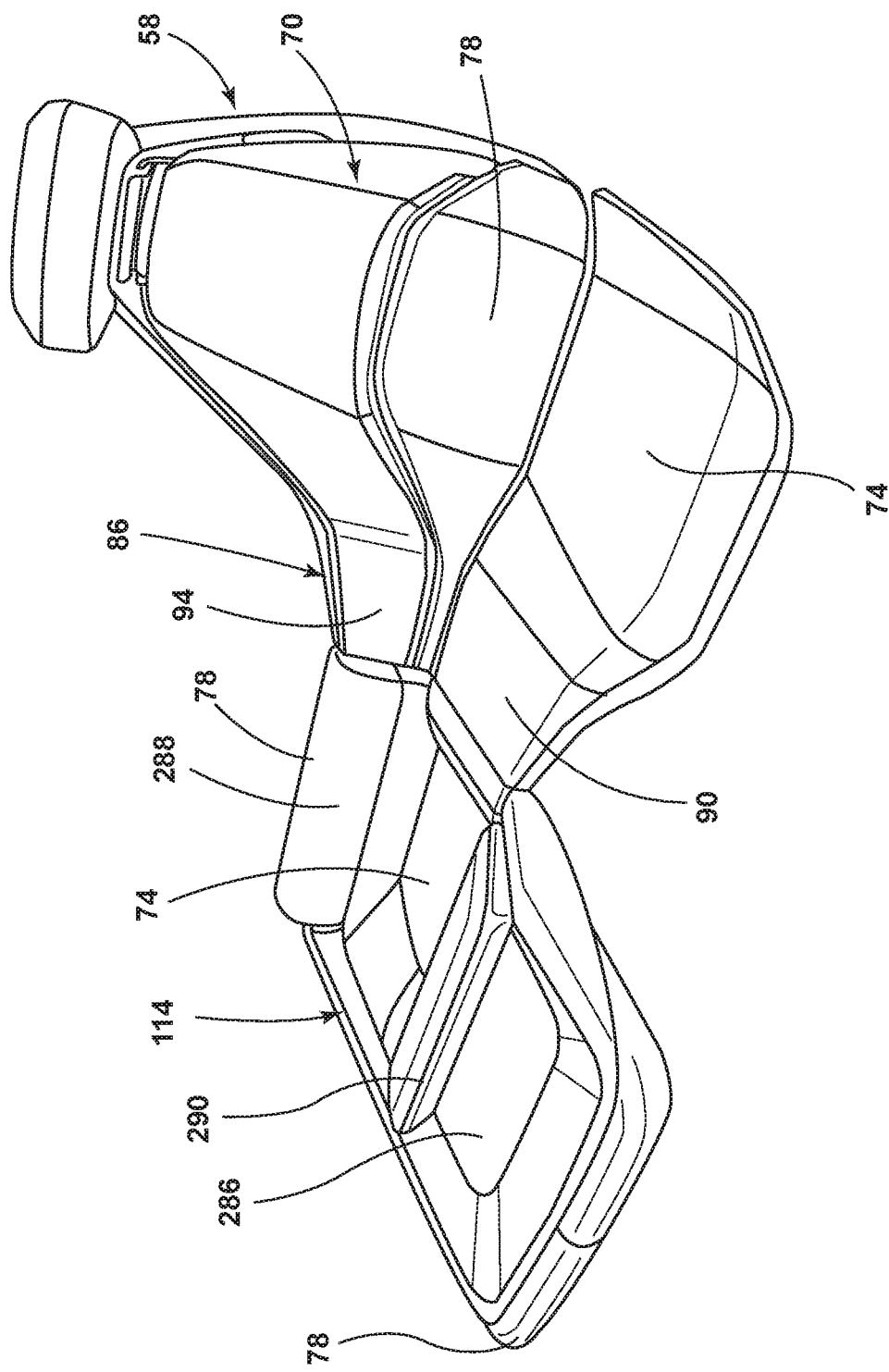
FIG. 20 is a front perspective view of the vehicle seating arrangement, illustrating a third seating assembly, according to one embodiment.
Figure 21:
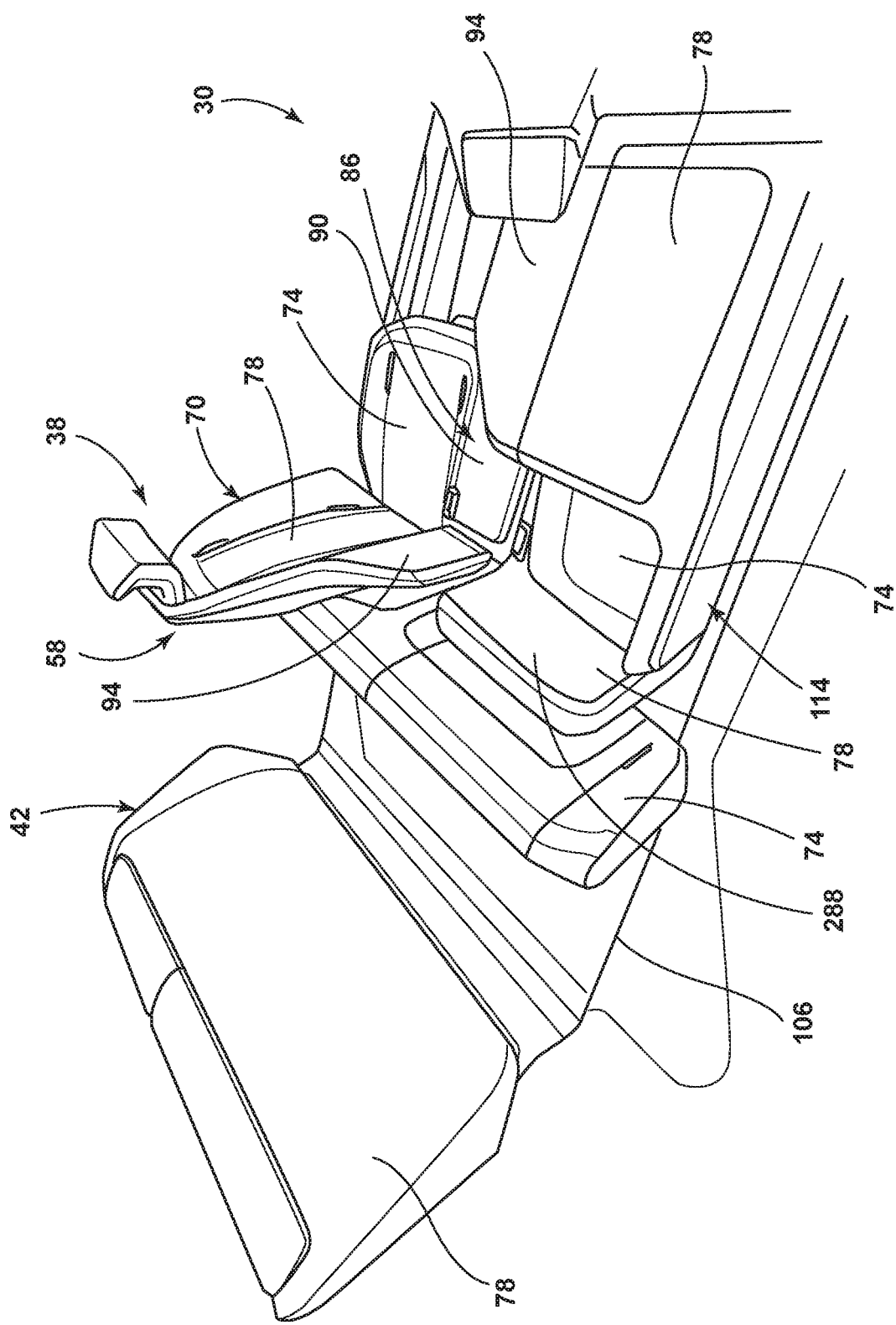
FIG. 21 is a side perspective view of the vehicle, illustrating the first and second rows of seats, according to one embodiment.

Referring now to FIGS. 20 and 21, the vehicle seating arrangement 58 is equipped with the side-wing 82. The vehicle seating arrangement 58 is positioned in the first row of seats 38 of the vehicle 30. The first row of seats 38 includes the first, second, and third seating assemblies 70, 86, 114. The side-wing seat 90 and the side-wing seatback 94 are integrally formed with, and extend from, the seat 74 and the seatback 78 of the first seating assembly 70, respectfully. The side-wing seatback 94 of the second seating assembly 86 may be at least partially carried on the third seating assembly 114. Said another way, at least a portion of the side-wing seatback 94 may extend from the seatback 78 of the third seating assembly 114. In some examples, the side-wing seatback 94 may partially extend from the seatback 78 of each of the first and third seating assemblies 70, 114. It is contemplated that the partitioning of the side-wing seatback 94 may be configured to allow the second seating assembly 86 to be occupied independent of whether the seatback 78 of the third seating assembly 114 is in a use position or a forward-dumped position. The seatback 78 of the third seating assembly 114 may be provided with a recessed region 286 on a rearward side of the seatback 78 such that upon placing the seatback 78 of the third seating assembly 114 in a forward-dumped position, the recessed region 286 may be utilized as an open storage area. When the seatback 78 of the third seating assembly 114 is in the forward-dumped position, at least a portion of the seatback 78 may remain in a generally vertical position. The portion of the seatback 78 that remains in the generally vertical position may prevent items stored on the third seating assembly 114 from falling off the third seating assembly 114 in a rearward direction. The portion of the seatback 78 that remains generally vertical may be referred to as a lumbar region 288 of the seatback 78. The recessed region 286 may include a retention wall 290 that may be configured to aid in retention of items that are stored in the recessed region 286. The retention wall 290 may be padded or cushioned. It is contemplated that the seat 74 of the third seating assembly 114 may be utilized to store items when the seatback 78 is in the forward-dumped position and that the retention wall 290 may aid in the retention of the items stored on the seat 74. It is further contemplated that the seat 74, the lumbar region 288, and the retention wall 290 may be utilized as a convenient and comfortable area for a pet to rest.

Referring again to FIGS. 20 and 21, the second row of seats 42 is positioned vehicle rearward of the first row of seats 38. The second row of seats 42 includes the seat 74 and the seatback 78 at each of a plurality of seating positions. The seat 74 of the second row of seats 42 may be pivoted about a rotational axis in a vehicle-forward direction such that the seat 74 assumes a generally vertical position and is proximal a rearward surface of the first row of seats 38. By so actuating the second row of seats 42, a generally flat and/or smooth surface may be presented to a user (e.g., the floor 106) that may be utilized for storing large cargo items, providing an area for a pet to rest in a relatively safe manner, or allow a user to rest in a substantially horizontal position along the generally flat and/or smooth surface comfortably. In examples where the rearward side of the seatback 78 of the third seating assembly 114 is generally flat or is provided with at least an area that is generally flat, the rearward side of the seatback 78 may be utilized as a work surface (FIG. 21).

The placement of storage solutions and various functionalities provided in the vehicle 30 often take into consideration a reach-zone of an occupant or user. Accordingly, limitations may exist in the design of new and improved user-experiences. Therefore, the vehicle seating arrangement 58 of the present disclosure provides various examples of improving the experience of the user while maintaining the storage solutions and various functionalities constantly within an easy-to-reach zone. The easy-to-reach zone may be defined by areas reachable to an occupant where the occupant does not need to bend a substantial amount at the waist. For example, the storage solutions and various functionalities disclosed and provided on the side-wing 82 fall well within an easy-to-reach zone for an occupant of the first and/or second seating assemblies 70, 86 regardless of a longitudinal position of the vehicle seating arrangement 58 along the rails 118.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating arrangement, comprising:
   a first seat;
   a first seatback, the first seat and the first seatback defining a first seating assembly;
   a side-wing seatback extending from the first seatback, wherein a surface of the side-wing seatback is longitudinally displaced from the first seatback, and wherein the side-wing seatback at least partially defines a second seating assembly; and
   an armrest that is coupled to the side-wing seatback, the armrest being deployable from the side-wing seatback, wherein deployment of the armrest from the side-wing seatback is accomplished by extending the armrest in a vertical direction out of an upper portion of the side-wing seatback followed by rotation of the armrest in a downward direction.

2. The vehicle seating arrangement of claim 1, wherein the side-wing seatback is longitudinally displaced rearward from the first seatback.

3. The vehicle seating arrangement of claim 1, wherein the first and second seating assemblies are slidably mounted to a floor of a vehicle such that an area of the floor directly below the first seat of the first seating assembly is free of engagement from components of the vehicle seating arrangement.

4. The vehicle seating arrangement of claim 1, further comprising:
   a hip bolster that is deployable.

5. The vehicle seating arrangement of claim 4, wherein the hip bolster is deployable from the first seatback.

6. The vehicle seating arrangement of claim 1, further comprising:
   a third seating assembly positioned adjacent to the second seating assembly, wherein the side-wing seatback of the second seating assembly is at least partially carried on the third seating assembly.

7. The vehicle seating arrangement of claim 1, wherein the deployment of the armrest places the armrest in a substantially horizontal position.

8. The vehicle seating arrangement of claim 1, wherein the deployment of the armrest places the armrest in a substantially parallel relationship with a side-wing seat.

9. The vehicle seating arrangement of claim 1, wherein the armrest comprises a sloped portion distal to a free end of the armrest and a planar surface proximate to the free end.

10. The vehicle seating arrangement of claim 9, wherein the sloped portion positions the planar surface of the armrest vertically below the upper portion of the side-wing seatback when the armrest is in a deployed position.

11. A vehicle seating arrangement, comprising:
    a first seat;
    a first seatback;
    an armrest that is deployable from the first seatback, wherein the armrest is deployed by a slidable movement in a lateral direction outwardly from the first seatback and a rotational movement in a longitudinal direction that is substantially perpendicular to the lateral direction; and a deployable hip bolster that is coupled to the first seat and the first seatback, with the deployable hip bolster extending between the first seat and the first seatback, the hip bolster being operable between a retracted position and an extended position.

12. The vehicle seating arrangement of claim 11, wherein the deployable hip bolster is deployed from the first seat.

13. The vehicle seating arrangement of claim 11, wherein the deployable hip bolster is deployed from the first seatback.

14. The vehicle seating arrangement of claim 11, wherein the deployable hip bolster is deployed from the first seat and the first seatback.

15. The vehicle seating arrangement of claim 11, wherein the deployable hip bolster is selectively actuated to the extended position during vehicle maneuvers.

16. A vehicle seating arrangement, comprising:
a first seat;
a first seatback;
a side-wing seatback extending from the first seatback, wherein the side-wing seatback is rotatable in an upward direction, wherein rotation of the side-wing seatback in the upward direction creates a front-to-back aperture that enables access between a first row of seats and a rearward row of seats, and wherein the side-wing seatback is longitudinally displaced relative to the first seatback.

17. The vehicle seating arrangement of claim 16, further comprising:
an air vent positioned on an inboard side of the first seat and directed rearward of the vehicle seating arrangement.

18. The vehicle seating arrangement of claim 16, wherein the side-wing seatback is rotatable in a forward direction and a rearward direction.

19. The vehicle seating arrangement of claim 18, wherein rotation of the side-wing seatback in the forward direction presents the side-wing seatback as an armrest.

\* \* \* \* \*